US012718066B2

(12) United States Patent
Yeh et al.

(10) Patent No.: US 12,718,066 B2
(45) Date of Patent: Aug. 25, 2026

(54) TIME SERIES PREDICTIVE MODEL FOR ESTIMATING METRIC FOR A GIVEN ENTITY

(71) Applicant: VISA INTERNATIONAL SERVICE ASSOCIATION, San Francisco, CA (US)

(72) Inventors: Michael Yeh, Newark, CA (US); Zhongfang Zhuang, Mountain View, CA (US); Junpeng Wang, Santa Clara, CA (US); Yan Zheng, Los Gatos, CA (US); Javid Ebrahimi, San Francisco, CA (US); Liang Wang, San Jose, CA (US); Wei Zhang, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 571 days.

(21) Appl. No.: 18/275,598

(22) PCT Filed: Feb. 1, 2022

(86) PCT No.: PCT/US2022/014795

§ 371 (c)(1),
(2) Date: Aug. 2, 2023

(87) PCT Pub. No.: WO2022/169781

PCT Pub. Date: Aug. 11, 2022

(65) Prior Publication Data

US 2024/0127035 A1 Apr. 18, 2024

Related U.S. Application Data

(60) Provisional application No. 63/145,404, filed on Feb. 3, 2021.

(51) Int. Cl.

*G06N 3/00* (2023.01)
*G06N 3/0455* (2023.01)

(52) U.S. Cl.

CPC .................................. *G06N 3/0455* (2023.01)

(58) Field of Classification Search

CPC ........................................................ G06N 3/00

See application file for complete search history.

(56) References Cited

U.S. PATENT DOCUMENTS 8,768,804 B2 7/2014 Holten et al.
8,914,317 B2 12/2014 Biem (Continued)

FOREIGN PATENT DOCUMENTS

CN 110942248 A 3/2020
CN 111797122 A 10/2020

OTHER PUBLICATIONS

Gama et al., "A Survey on Concept Drift Adaptation", The Association for Computing Machinery Computing Surveys, vol. 1, No. 1, Jan. 2013, 44 pages.

(Continued)

*Primary Examiner* — Maryam A Nasri
(74) *Attorney, Agent, or Firm* — Kilpatrick Townsend & Stockton LLP

(57) ABSTRACT

A method performed by a computer is disclosed. The method comprises receiving interaction data between electronic devices of a plurality of entities. The interaction data is used to form an entity interaction vector containing a number of interactions between the electronic devices of a chosen entity and an entity time series containing a plurality of metrics per unit time of the interactions. An interaction encoder of the computer can generate an interaction hidden representation of the entity interaction vector using embeddings of the plurality of entities. A temporal encoder of the computer can generate a temporal hidden representation of the entity time series. The interaction hidden representation and the temporal hidden representation can be used to generate a predicted scale and a shape estimation of a target (Continued)

interaction metric. The computer can then generate an estimated interaction metric of a time period using the predicted scale and the shape estimation.

20 Claims, 25 Drawing Sheets

(56) References Cited

U.S. PATENT DOCUMENTS

| | | | | |
|---|---|---|---|---|
| 10,417,556 | B1 | 9/2019 | Fairbank et al. | |
| 10,878,505 | B1 | 12/2020 | Blair et al. | |
| 11,107,085 | B2 | 8/2021 | Ivakhnenko | |
| 11,144,834 | B2 | 10/2021 | Zoldi et al. | |
| 2013/0159310 | A1 | 6/2013 | Birdwell et al. | |
| 2017/0270428 | A1 | 9/2017 | Zoldi et al. | |
| 2022/0366494 | A1* | 11/2022 | Cella | G06N 3/006 |
| 2023/0206329 | A1* | 6/2023 | Cella | G06Q 20/405 |

OTHER PUBLICATIONS

Gharghabi et al., "Matrix Profile VIII: Domain Agnostic Online Semantic Segmentation at Superhuman Performance Levels", Available online at: https://mcyeh.github.io/paper/2017_icdm_domain_agnostic_online.pdf, Nov. 18, 2017, 10 pages.

Swayamdipta et al., "Dataset Cartography: Mapping and Diagnosing Datasets with Training Dynamics", Available online at: https://arxiv.org/pdf/2009.10795, Oct. 15, 2020, 19 pages.

Yeh et al., "Merchant Category Identification Using Credit Card Transactions", Available online at: https://arxiv.org/pdf/2011.02602, Nov. 5, 2020, 9 pages.

Application No. PCT/US2022/014795 , International Search Report and Written Opinion, Mailed On May 17, 2022, 12 pages.

Harries et al., "Detecting Concept Drift in Financial Time Series Prediction Using Symbolic Machine Learning", Available Online at: https://citeseerx.ist.psu.edu/document?repid=rep1&type=pdf&doi=812727010e988fc3c94c9beb6caef1fb75f6e766, Jul. 1996, 8 pages.

Soemers et al., "Adapting to Concept Drift in Credit Card Transaction Data Streams Using Contextual Bandits and Decision Trees", Available Online at: https://dennissoemers.github.io/assets/publications/SoemersCreditCardIAAI.pdf, Apr. 27, 2018, 6 pages.

* cited by examiner

TEMPORAL HIDDEN REPRESENTATION, $\mathbf{h_I}$
812
0.2, 0.1, 0.8, 0.4, 0.3

Linear
814

ReLU
816

Linear
818

Softmax
820

SHAPE ESTIMATION
822

INTERACTION HIDDEN REPRESENTATION, $\mathbf{h_T}$
802
[0.1, 0.5, 0, 0.3, ..., 0.1]

Linear
804

ReLU
806

Linear
808

SHAPE BANK
810

Figure 11:
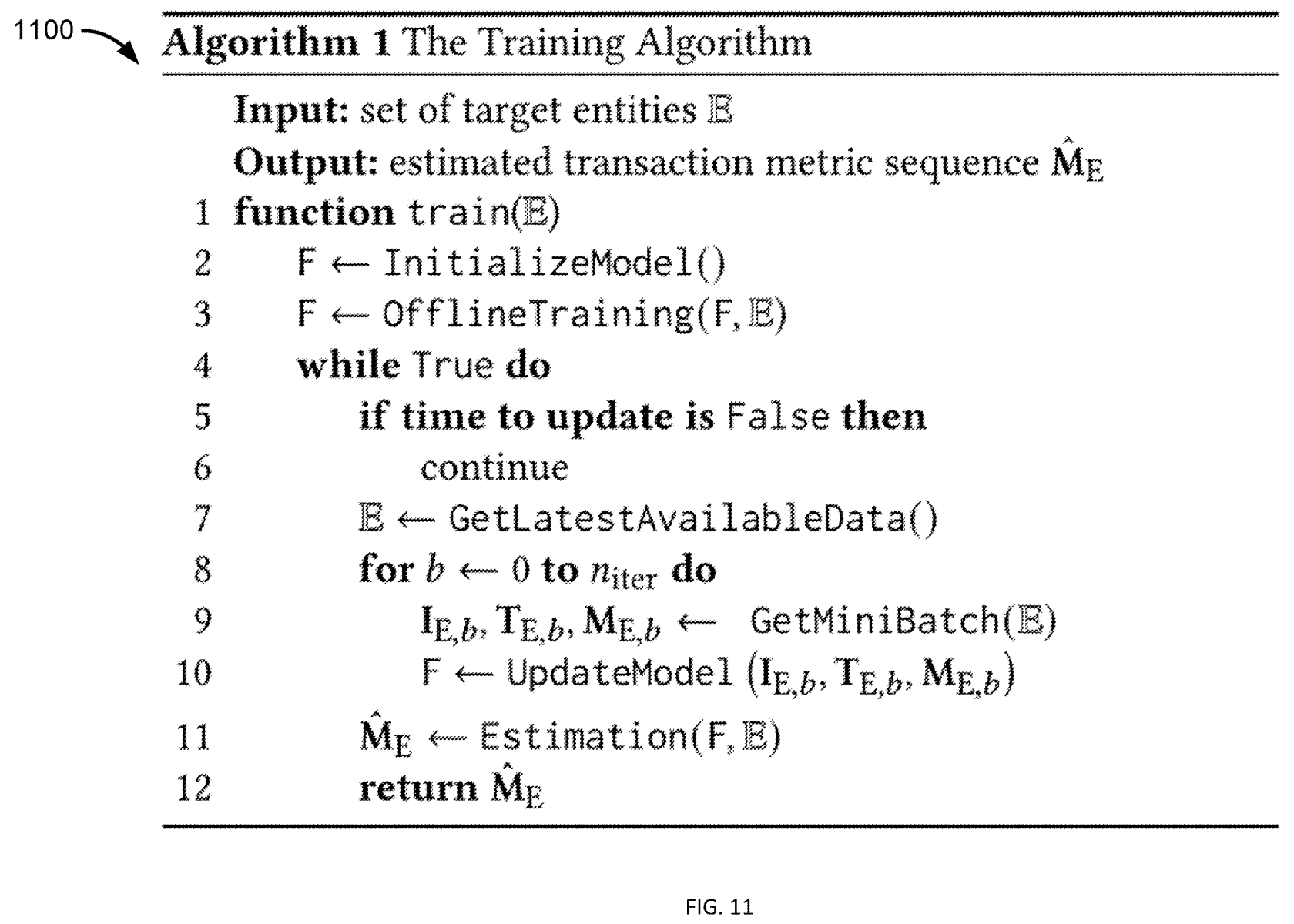

1100

Algorithm 1 The Training Algorithm

Input: set of target entities $\mathbb{E}$

Output: estimated transaction metric sequence $\hat{\mathbf{M}}_{\mathrm{E}}$ function `train`($\mathbb{E}$)
  $\mathtt{F} \leftarrow$ `InitializeModel()`
  $\mathtt{F} \leftarrow$ `OfflineTraining`($\mathtt{F}, \mathbb{E}$)
  while `True` do
    if time to update is `False` then
      continue
    $\mathbb{E} \leftarrow$ `GetLatestAvailableData()`
    for $b \leftarrow 0$ to $n_{\mathrm{iter}}$ do
      $\mathbf{I}_{\mathrm{E},b}, \mathbf{T}_{\mathrm{E},b}, \mathbf{M}_{\mathrm{E},b} \leftarrow$ `GetMiniBatch`($\mathbb{E}$)
      $\mathtt{F} \leftarrow$ `UpdateModel` $\left(\mathbf{I}_{\mathrm{E},b}, \mathbf{T}_{\mathrm{E},b}, \mathbf{M}_{\mathrm{E},b}\right)$
    $\hat{\mathbf{M}}_{\mathrm{E}} \leftarrow$ `Estimation`($\mathtt{F}, \mathbb{E}$)
    return $\hat{\mathbf{M}}_{\mathrm{E}}$

Algorithm 2 The Modified FLUSS Algorithm

Input: Entity time series $\mathbf{T}_{\mathrm{E}}$
Output: Sampling probability $P$ function $\texttt{getProb}(\mathbf{T}_{\mathrm{E}})$
    for $j \leftarrow 1$ to $d$ do
        $T_{j,\texttt{MPI}} \leftarrow \texttt{GetMatrixProfileIndex}(\mathbf{T}_{\mathrm{E}}^{j})$
        $T_{j,\texttt{CAC}} \leftarrow \texttt{GetCorrectedArcCount}(T_{j,\texttt{MPI}})$
        $P \leftarrow \texttt{Add}(T_{j,\texttt{CAC}})$
    $p_{\texttt{min}} \leftarrow \texttt{inf}$
    for $j \leftarrow \texttt{length}(P)$ to 1 do
        if $P[j] < p_{\texttt{min}}$ then
            $p_{\texttt{min}} \leftarrow P[j]$
        else
            $P[j] \leftarrow p_{\texttt{min}}$
    $P \leftarrow \frac{P}{\texttt{Sum}(P)}$
    return $P$

| | CNN-based Encoder | | | RNN-based Encoder | | |
|---|---|---|---|---|---|---|
| | RMSE | NRMSE | $R^2$ | RMSE | NRMSE | $R^2$ |
| Base | 8.2741 | 0.8545 | 0.1493 | 7.7352 | 0.8287 | 0.1943 |
| Base + Inter. | 7.3165 | 0.8256 | 0.2026 | 7.0617 | 0.8098 | 0.2268 |
| % Improve | 11.6% | 3.4% | 35.7% | 8.7% | 2.3% | 16.7% |

| | CNN-based Encoder | | | RNN-based Encoder | | |
|---|---|---|---|---|---|---|
| | RMSE | NRMSE | $R^2$ | RMSE | NRMSE | $R^2$ |
| Base + Inter. | 7.3165 | 0.8256 | 0.2026 | 7.0617 | 0.8098 | 0.2268 |
| Propose | 5.7147 | 0.7386 | 0.2771 | 6.4736 | 0.7426 | 0.2598 |
| % Improve | 21.9% | 10.5% | 36.8% | 8.3% | 8.3% | 14.6% |

| Method | RMSE | NRMSE | $R^2$ |
|---|---|---|---|
| Linear Model | 9.1732 | 1.1039 | 0.0312 |
| *k* Nearest Neighbor | 6.2690 | 0.8452 | 0.2217 |
| Random Forest | 6.0354 | 0.8224 | 0.2172 |
| Gradient Boosting | 7.7524 | 0.8670 | 0.1638 |
| **Proposed** | **5.7147** | **0.7386** | **0.2771** |
| % Improve | 4.4% | 10.2% | 27.3% |

| Method | RMSE | NRMSE | $R^2$ |
|---|---|---|---|
| Offline | 5.7147 | 0.7386 | 0.2771 |
| **Online Baseline** | **5.5240** | **0.7159** | **0.3258** |
| % Improve | 3.3% | 3.1% | 17.6% |

| Method | RMSE | NRMSE | $R^2$ |
|---|---|---|---|
| Online Baseline | 5.5240 | 0.7159 | 0.3258 |
| **Online Best** | **5.3800** | **0.7000** | **0.3400** |
| % Improve | 2.6% | 2.2% | 4.4% |

| RMSE | Uniform | Fix (90) | Fix (365) | Decay | Segment | Average |
|---|---|---|---|---|---|---|
| Uniform | 21.00 | 22.44 | 15.67 | 18.33 | 16.11 | 18.71 |
| Similar | 16.22 | 19.56 | 14.11 | 12.00 | 17.00 | 15.78 |
| High-error | 28.00 | 32.44 | 29.00 | 28.00 | 30.22 | 29.53 |
| Low-error | 12.11 | 9.89 | 8.44 | 9.22 | 7.22 | 9.38 |
| High-confidence | 14.67 | 17.11 | 12.78 | 11.67 | 11.67 | 13.58 |
| Low-confidence | 33.44 | 37.44 | 32.44 | 32.22 | 34.00 | 33.91 |
| High-variability | 25.44 | 31.11 | 26.00 | 23.56 | 27.11 | 26.64 |
| Low-variability | 20.33 | 19.89 | 14.89 | 14.11 | 13.11 | 16.47 |
| Average | 21.40 | 23.74 | 19.17 | 18.64 | 19.56 | |

| NRMSE | Uniform | Fix (90) | Fix (365) | Decay | Segment | Average |
|---|---|---|---|---|---|---|
| Uniform | 29.11 | 11.78 | 20.00 | 30.00 | 7.11 | 19.60 |
| Similar | 16.22 | 7.22 | 9.67 | 7.33 | 2.56 | 8.60 |
| High-error | 35.11 | 24.67 | 30.00 | 25.56 | 17.67 | 26.60 |
| Low-error | 28.00 | 9.78 | 18.89 | 15.67 | 6.56 | 15.78 |
| High-confidence | 28.33 | 13.33 | 21.78 | 15.44 | 6.33 | 17.04 |
| Low-confidence | 37.22 | 34.67 | 34.00 | 28.22 | 23.22 | 31.47 |
| High-variability | 32.78 | 27.22 | 28.00 | 25.22 | 19.22 | 26.49 |
| Low-variability | 29.67 | 13.11 | 22.89 | 17.56 | 8.89 | 18.42 |
| Average | 29.56 | 17.72 | 23.15 | 20.63 | 11.45 | |

| $R^2$ | Uniform | Fix (90) | Fix (365) | Decay | Segment | Average |
|---|---|---|---|---|---|---|
| Uniform | 30.56 | 8.44 | 22.11 | 30.67 | 10.67 | 20.49 |
| Similar | 16.11 | 5.00 | 13.22 | 9.89 | 5.67 | 9.98 |
| High-error | 32.44 | 21.89 | 30.44 | 24.67 | 17.67 | 25.42 |
| Low-error | 27.89 | 5.78 | 23.00 | 16.89 | 8.67 | 16.45 |
| High-confidence | 28.89 | 10.89 | 24.33 | 19.22 | 10.33 | 18.73 |
| Low-confidence | 36.89 | 28.22 | 34.78 | 26.67 | 23.11 | 29.93 |
| High-variability | 28.22 | 24.44 | 26.11 | 21.89 | 19.78 | 24.09 |
| Low-variability | 30.67 | 11.56 | 23.56 | 18.56 | 10.22 | 18.91 |
| Average | 28.96 | 14.53 | 24.69 | 21.06 | 13.26 | |

FIG. 23

TIME SERIES PREDICTIVE MODEL FOR ESTIMATING METRIC FOR A GIVEN ENTITY

CROSS-REFERENCES TO RELATED APPLICATIONS

This application is a 371 application of international patent application no. PCT/US2022/014795, filed Feb. 1, 2022, which claims the benefit of the filing date of U.S. Patent Application No. 63/145,404 filed Feb. 3, 2021, which is herein incorporated by reference in its entirety for all purposes.

BACKGROUND

A multivariate time series can be used for estimating interaction metrics associated with entities in an interaction database. Estimating interaction metrics associated with an entities' transnational behavior within a payment processing network is essential for system monitoring. A multivariate time series, aggregated from an entities' past transaction history, can provide insight for estimating the interaction metric. The general multivariate time series prediction has been applied across several domains, including manufacturing, medical, and entomology. However, there are several domain related challenges associated with payment data, such as concept drift and multi-modality, in addition to the real-time requirements of handling payment data at scale.

Embodiments of the disclosure address this problem and other problems individually and collectively.

SUMMARY

One embodiment of the present invention includes a method performed by a computer. The method comprises receiving interaction data between electronic devices of a plurality of entities. The interaction data is used to form an entity interaction vector containing a number of interactions between the electronic devices of a chosen entity of the plurality of entities and the plurality of entities. The interaction data is additionally used to form an entity time series containing a plurality of metrics per unit time of the interactions of the electronic devices of the chosen entity. The computer can use an interaction encoder to generate an interaction hidden representation of the entity interaction vector using embeddings of the plurality of entities. The embeddings can represent interactions between the electronic devices of the plurality of entities. The computer can use a temporal encoder to generate a temporal hidden representation of the entity time series. The temporal hidden representation can capture time-varying patterns of the interactions between the electronic devices of the plurality of entities. The interaction hidden representation and the temporal hidden representation can both be used to generate a predicted scale comprising a magnitude of a target interaction metric. The interaction hidden representation and the temporal hidden representation can both be used to additionally generate a shape estimation of the target interaction metric. The computer can then generate an estimated interaction metric of a time period using the predicted scale and the shape estimation.

Another embodiment of the present invention includes a computer. The computer comprises a processor and a non-transitory computer readable medium comprising instructions executable by the processor to perform operations including: receiving interaction data between electronic devices of a plurality of entities, wherein the interaction data is used to form (1) an entity interaction vector containing a number of interactions between the electronic devices of a chosen entity of the plurality of entities and the plurality of entities and (2) an entity time series containing a plurality of metrics per unit time of the interactions of the electronic devices of the chosen entity; generating an interaction hidden representation of the entity interaction vector, wherein the interaction hidden representation captures information about interactions between the electronic devices of the plurality of entities; generating a temporal hidden representation of the entity time series, wherein the temporal hidden representation captures inherent patterns of the interactions between the electronic devices of the plurality of entities; generating a predicted scale comprising a magnitude and an offset of a shape estimation of the interaction data of the interaction data; generating the shape estimation of the interaction data; and generating an estimated interaction metric for a time period using the predicted scale of the interaction data and the shape estimation of the interaction data.

A better understanding of the nature and advantages of embodiments of the invention may be gained with reference to the following detailed description and accompanying drawings.

BRIEF DESCRIPTION OF THE DRAWINGS

FIG. 11 shows a training algorithm according to embodiments of the present invention.

FIG. 12 shows a modified FLUSS algorithm according to embodiments of the present invention.

FIG. 16 shows a table demonstrating the improvement of using an entity time series.

FIG. 17 shows a table demonstrating the improvement of using a shape and scale decoder.

FIG. 18 shows a table demonstrating the improvement of the interaction metric estimation model over several machine learning models.

FIG. 19 shows a table demonstrating the improvement of using online training in addition to offline training.

FIG. 20 shows a table demonstrating the performance benefits of improving the online training scheme.

FIG. 21 shows a table demonstrating an RMSE performance metric of several combinations of temporal-based sampling techniques and non-temporal-based sampling techniques.

FIG. 22 shows a table demonstrating an NRMSE performance metric of several combinations of temporal-based sampling techniques and non-temporal-based sampling techniques.

FIG. 23 shows a table demonstrating an $R^2$ performance metric of several combinations of temporal-based sampling techniques and non-temporal-based sampling techniques.

DETAILED DESCRIPTION OF THE INVENTION

Interactions can be performed by a variety of users of a network to send a receive communications, and may occur across different geographical areas, such as countries. For example, users holding a credit card of a payment processing network may conduct transactions to shop for groceries, fine dining, or other to perform other purchases. Another example can include a user connecting via a first electronic device (e.g., a computer, a mobile device, a laptop, etc.) to a second electronic device to transmit data between the two computers (e.g., the user can use the first computer to log in to an account maintained by the second computer). The above examples are examples of access requests, where a user requests access to a resource from another computer.

To improve service and user experience, processing networks can study entity interaction behavior within the network. For each entity within the network, their interaction behavior can be modeled as a multivariate time series with multiple time varying features. Additionally, the entity specific multivariate time series can be further aggregated based on different criteria (e.g., where the credit card or account of a user of the payment network was issued) to provide additional macro-level insights. In some examples, the true interaction metrics may not be immediately available in the system due to limitations of the processing network, such as resource limitations in calculating the interaction metrics, delays in manual reports, or communication failures. In some examples, the true interaction metric may not be available to the processing network for a significant amount of time and as such it is imperative for the processing network to estimate the interaction metric for monitoring of the processing network. Significant challenges arise, including concept drift, the use of multiple modalities, and large interaction data sets, when building a model to estimate interaction metrics.

Concept drift occurs as the interaction behavior of entities performing interactions within a processing network is constantly evolving. A static prediction model can be rendered useless after days or months if the model does not actively evolve with the entities' behavior. Moreover, at a higher aggregation level, additional factors such as economic, geopolitical, and others (e.g., global pandemic) can have an impact on patterns within the multivariate time series of entities and the interaction metric, subsequently causing concept drift. Concept drift poses significant challenges in real-world applications, as opposed to experimental data which is static and well-cleaned. Online learning techniques are used to resolve the challenge of concept drift. Supervised online learning is a learning scheme wherein the training data is made available to the model incrementally over time.

Figure 1:
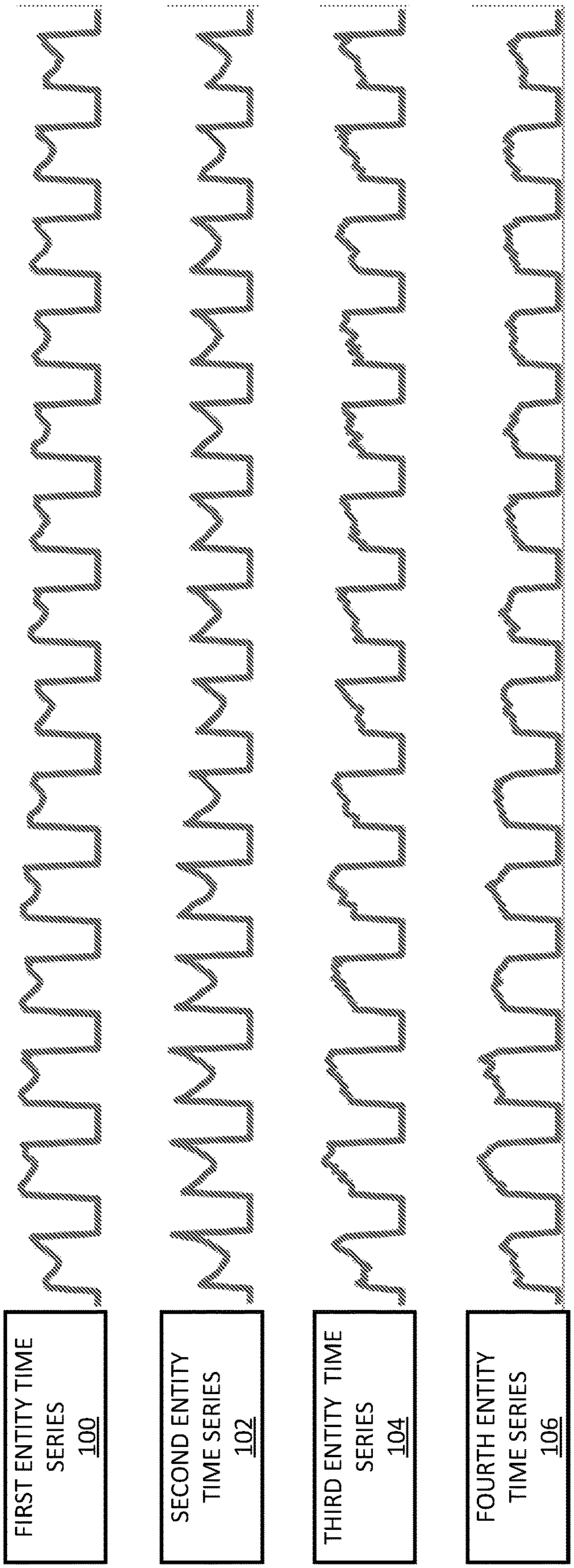
FIG. 1 shows an exemplary interaction time series for a plurality of entities.

A multi-modality approach that models the relationship, or the interactions among the entities of a network is preferred. As shown in FIG. 1, an entities' interaction time series may exhibit similar trends as another entity. If additional modalities further distinguish entities with similar time series, the model can use such modalities to better estimate the target entity-specific interaction metric. However, many conventional approaches lack the ability and means to utilize additional modalities.

For many processing networks, due to the significant amount of interactions performed within the network (e.g., a payment processing network may conduct several millions of transactions a day), running hourly estimations for the interaction metric is not feasible. To overcome this limitation, a more realistic approach would be to predict multiple time-steps at once. This approach is known as a multi-horizon time series prediction, and requires a unique model design to handle such as situation. Appling a one-step prediction model in a rolling fashion can lead to inferior results, as the predictions for a later time step is made based on an estimated input. That is, errors from the earlier time step propagate through to later time steps.

In some embodiments, a learning model capable of estimating multi-horizon interaction metrics using multi-modality of time series is used to handle the above two limitations of multi-modality and resource limitations. The learning model can comprise five unique components including an interaction encoder, a temporal encoder, a scale decoder, a shape decoder, and an amalgamate layer. The interaction encoder can be used to process the interaction modality (e.g., how entities interact with each other in the interaction data). The temporal encoder can dissect the temporal data and learns the inherent patterns of the interaction data. The scale decoder and the shape decoder can provide two distinct, yet related perspectives regarding the estimated multi-horizon interaction metric. The amalgamate layer can combine the outputs of the scale and shape decoder to synthesize the output.

I. Entity Interactions

An interaction data set comprises data of interactions performed by an entity. One example of an interaction is an access request. An access request can be a first entity requesting access to a resource, such as a physical good or access to a computer account, from a second entity. The interaction data can contain the time that the interaction was performed. A time series of the interaction data set can be formed using the time of interactions. For example, an entity may be country and the interaction data set can be a transaction data set comprising transaction data of transactions performed by credit card users in the country. The transaction data can indicate what time the transaction was performed. A transaction time series may be formed using the time, and may indicate the number of transactions performed during each time step (e.g., transactions per minute, transactions per hour, etc.). Other examples of time series that can be formed using interaction data include an interaction time series using a number of declined transactions during each time step, an amount of log in attempts to a computer account during each time step, an amount of transactions performed by a unique credit card held by users of the payment processing network during each time step or the like.

FIG. 1 shows an exemplary interaction time series for a plurality of entities. A first entity may be a first country, a second entity may be a second country, a third entity may be a third country, and a fourth entity may be a fourth country. The interaction time series for a country may include the number interactions performed in the country at a certain time. For example, the first entity time series 100 may be the amount of interactions performed in the first country. Similarly, the second entity time series 102, the third entity time series 104, and the fourth entity time series 106 can be the interaction time series for second country, a third country, and a fourth country respectively. Similar countries (e.g., based on location) may exhibit behaviors. For example, the first entity time series 100 and the second entity time series 102 more closely resemble each other time series, and so they may be geographically close (e.g., the first entity may be Australia and the second entity may be New Zealand).

II. Interaction Modeling

An entity can be represented from interaction data with several views. One view includes an entity interaction time series. An entity interaction time series for an entity E is a multivariate time series, denoted as $T_E \in \mathbb{R}^{\tau_e d}$, where $\tau_e$ is the length of the time series and d is the number of features. $T_E[i:j]$ can denote the subsequence starting at the i-th timestamp, and ending at the j-th timestamp.

In an example system, each entity may be a country and the interaction data statistics are computed hourly. A prototype model is trained using transaction data of several countries from Jan. 1, 2017 through Dec. 31, 2017. The length of the time series $\tau_e$ in the transaction data is equal to 24×365=8,760. The number of features d is the transaction data is equal to 14, which is the number of statistics of the transaction data that is extracted during the hourly window.

Another view of an entity includes an entity interaction vector. Given an entity E within an entity set $\mathbb{E}$ containing k total entities, the entity interaction vector $I_E \in \mathbb{R}^k$ is defined as the amount of interaction between the entity E and each of the other k total entities. The entity interaction vector $I_E$ can vary over time, and $I_E[i]$ can denote the entity interaction vector at the i-th timestamp.

In the global transaction data used for training there are 233 total counties. The entity interaction vector for a country i is a vector of length 233. Each entity interaction vector records the number of transactions made by cards (e.g., credit cards) issued in the country i, at merchants with different countries within the past thirty days. The entity interaction vector is computed daily, meaning there is a total of 365 entity interaction vectors for each country in the transaction data. The entity time series $T_E$ captures the entities' E behavior at a finer time resolution (e.g., hourly rather than daily), whereas the entity interaction vector $I_E$ provides a view on the relationship between different countries in a coarser time resolution (e.g., a thirty day window). Each country's interaction vector is projected to two-dimensions for the first month of 2017 and is shown in FIG. 2.

Figure 2:
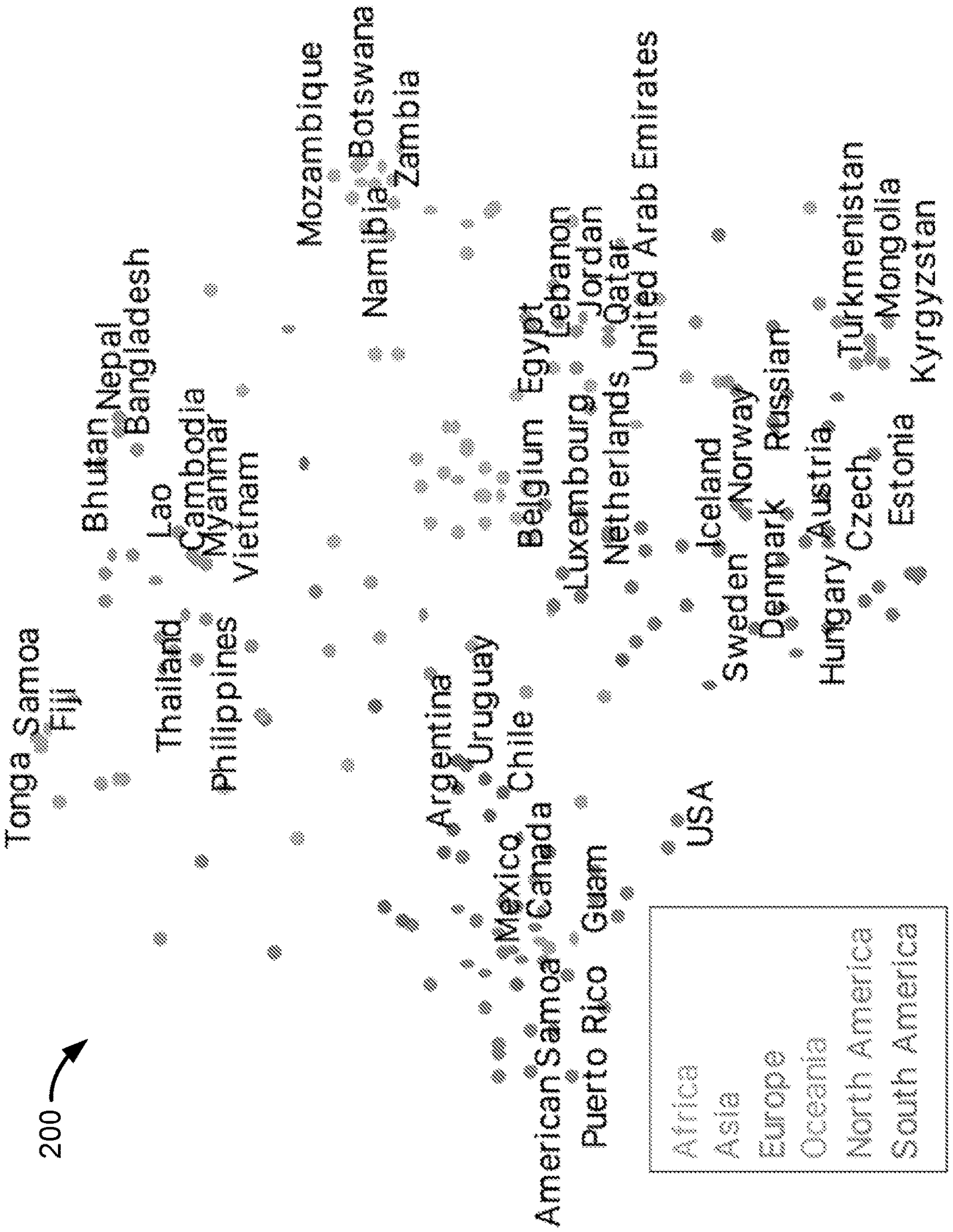
FIG. 2 shows a two-dimensional projection of interaction vectors for a plurality of entities.

FIG. 2 shows a two-dimensional projection of interaction vectors for a plurality of entities. Geographically close countries (e.g., Mexico, Canada, and the United States of America) are generally close in the plot 200. The plot 200 of all country interaction vectors captures both geographic and political relationships amongst the countries of the global transaction data used to train the prototype model. Concept drift can be seen by the movement of the countries in the plot 200. For example, a merchant in Canada that processes transactions with a payment processing network may choose to no longer purchase goods from a supplier in France, and instead purchase goods from a different supplier in Germany. Overtime, changes in the transaction behavior of merchants cause concept drift.

An entity interaction metric is a time series, denoted as $M_E \in \mathbb{R}^{\tau_m}$, where $\tau_m$ is the length of the time series. The entity interaction metric $M_E$ can vary with time, and $M_E[i:j]$ denote the subsequence starting at the i-th timestamp and ending at the j-th timestamp. For the systems and models presented in the application, the entity interaction metric series stores each of the entities' target interaction metric per time period. As both $M_E$ and $T_E$ have the same sampling rate, both time series have the same length (e.g., the length $\tau_e$ is equal to 8,760 for the global transaction data, and is equal to the length $\tau_m$).

III. Interaction Metric Estimation System

Given an entity E, the entity interaction vector $I_E[i]$ and the entity time series $T_E[i-t_p:j]$, the goal of the interaction metric estimation is to learn a model F that can be used to predict the interaction metric of the entity between the time $i-t_a$ and $i+t_b$. $t_a$ is the number of backward time steps and $t_b$ is the number of forward time steps desired to estimate the interaction metric. The model F can be formulated as follows:

$$\hat{M}_E[i-t_p:i+t_b] \leftarrow F(T_E[i-t_p:i], I_E[i]) \quad (1)$$

Where $\hat{M}_E[i-t_p:i+t_b]$ is the estimated interaction metric from $i-t_a$ and $i+t_b$.

A multi-horizon time series is used in the estimation model F to create buffer time between each consecutive prediction to ensure that there is no downtime in the production environment. As a running example, the time period that the interaction metric is predicted is equal to 24 hours (e.g., $t_b$=24). For some interaction metrics, estimating the past metric is also required if there is a delay before the model F can access the true interaction metric. By observing an entities' past interaction behavior, the model F can generate a more accurate estimation for analysis before the true interaction metric is available to the model F. The estimation model F estimates the interaction metric for the past 24 hours (e.g., $t_a$=24). For the input entity time series, only $t_p$ time steps are used instead of all of the available time series for efficiency. In the running example, a total of 168 hours (e.g., $t_a$=168), or seven days, is used as the time step $t_p$. The past target metric is not a part of the input to the estimation model F because the delay before the model F can observe the true interaction metric is longer than seven days.

Given a training data set consisting of both entity time series and entity interaction vectors from time step 1 through to time step $\tau_e$ for each entity E in the entity set $\mathbb{E}$, the model F is learned by minimizing the following loss function:

$$\sum\nolimits_{E \in \mathbb{E}, i \in [1,\tau_e]} \text{loss}\left(\hat{M}_E[i-t_a:i+t_b], M_E[i-t_p:i+t_b]\right) \quad (2)$$

Where loss( ) is can be any regression loss function, such as mean squared error.

A. System Overview

The interaction metric estimation system has two training phases: a first offline training phase and an online training phase. Before the interaction metric estimation system is deployed, an offline training module may pull data from an interaction database to train an initial interaction metric estimation model.

Figure 3:
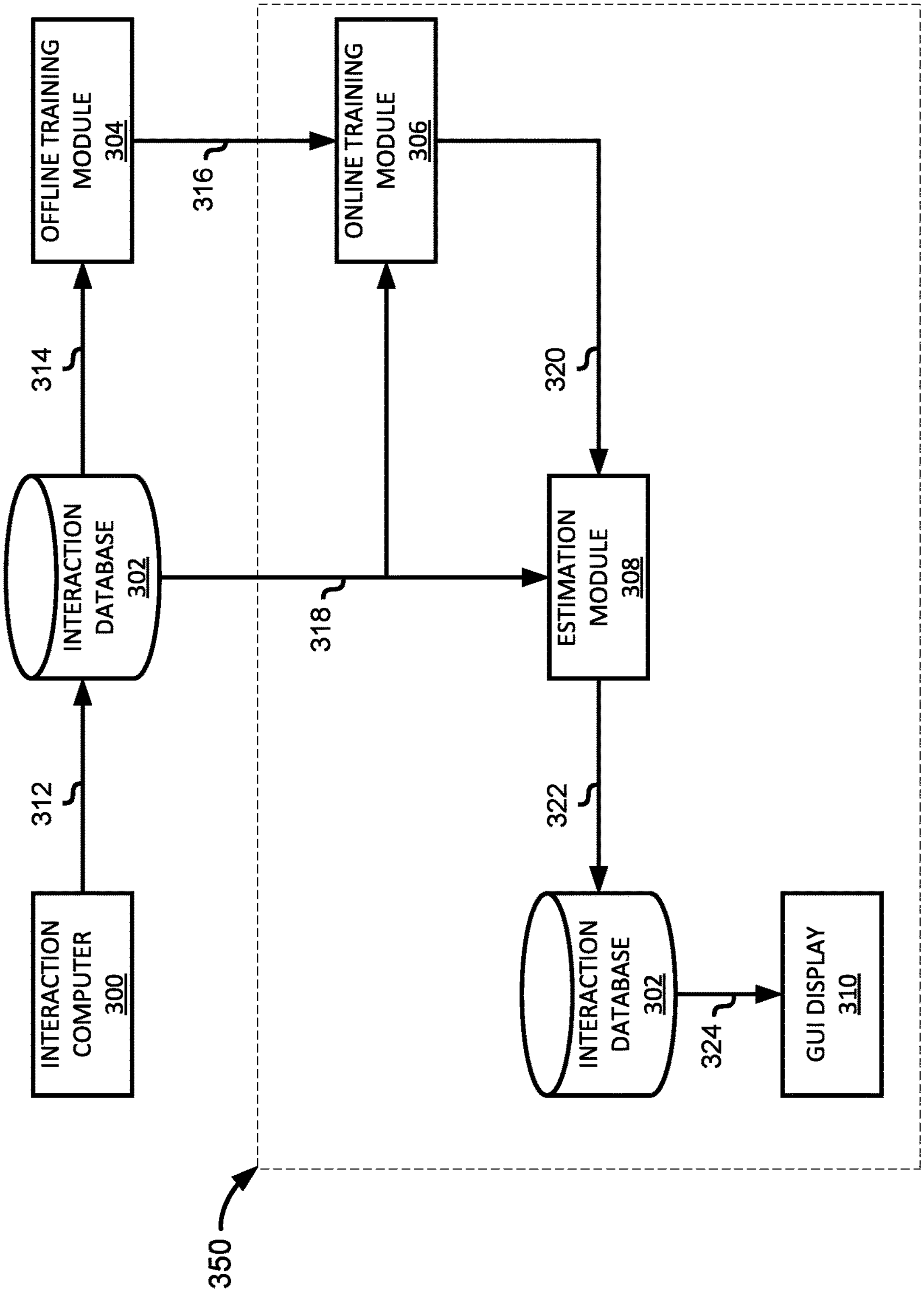
FIG. 3 shows a block diagram of an interaction metric estimation system according to embodiments of the present invention.

FIG. 3 shows a block diagram of an interaction metric estimation system according to embodiments of the present invention. The interaction metric estimation system comprises an interaction computer 300, an interaction database 302, an offline training module 304, an online training module 306, an estimation module 308, and a GUI display 310. The interaction computer 300 may be operated by a processing network such as a payment processing network. The interaction computer 300 may be configured to receive information about interactions between the electronic devices of the plurality of entities. The interaction computer 300 may communicate with electronic devices of a plurality of entities to perform interactions.

The interaction computer 300 may receive an access request for a destination entity of the plurality of entities. The access request can comprise interaction data for an interaction between a sender entity and a receiver entity. The interaction data of the access request can be used to update the entity interaction vector and the entity time series associated with the destination entity of the plurality of entities. For example, the interaction computer 300 may communicate with an access device (e.g., a POS terminal) operated by a merchant located in a first country (e.g., a receiver entity) and an issuer computer, associated with a credit card of a user, located in a second country (e.g., a sender entity) to perform a transaction between the merchant and the user to receive transaction data related to the transaction. The access device and the issuer computer (or the credit card) can be examples of electronic devices of a plurality of entities.

At step 312, the interaction computer 300 can store interaction data in the interaction database 302. The interaction data may comprise a number of features on the interactions (e.g., the type of interaction that was made, the location the interaction was conducted at, the time the interaction was conducted). The interaction data may be aggregated based on the time the interaction was conducted to form entity interaction vectors and interaction time series relating to the entity that performed the interaction. For example, the interaction computer 300 can use the interaction data received to modify an existing time series and interaction vector associated with the entity that performed the interaction. In another example, the interaction computer 300 can use all of the stored interaction data associated with an entity to generate an entity time series and an entity interaction vector.

At step 314, the offline training module 304 may pull interaction data from the interaction database 302. The offline training module 304 may use the interaction data to train an initial interaction metric estimation model. The entity interaction vectors and entity interaction time series may be by the offline training module 304 to train the initial interaction metric estimation model using an offline training algorithm.

The interaction computer 300 may continue to process interactions and update the interaction data held by the interaction database 302 to include the new interactions. The new interactions may be used to update entity interaction vectors and time series as they are received.

At step 316, after the initial interaction metric estimation model is trained, the online training module 306 may retrieve the initial interaction metric estimation model from the offline training module 304.

At step 318, the online training module 306 can retrieve the updated interaction data from the interaction database 302. The online training module 306 can update the initial interaction metric estimation model using the updated interaction data using an online training algorithm.

Additionally, at step 318, the estimation module 308 can retrieve the updated interaction data from the interaction database 302. At step 320, after the online training module 306 updates the initial interaction metric estimation model, the estimation module 308 may retrieve the updated interaction metric estimation model from the online training module 306. The estimation module 308 may produce the estimated interaction metric for a next time period and a previous time period for an entity. For example, the estimation module 308 can produce the estimated interaction metric for an entity for both the previous 24 hours and the next 24 hours.

At step 322, after producing the estimated interaction metric for an entity can be stored by the estimation module 308 in the interaction database 302.

At step 324, the estimated interaction metric in the interaction database 302 can be displayed on the GUI display 310. For example, the GUI display 310 can display a graphical representation of the most recent estimated interaction metric. A user of the interaction metric estimation system can monitor the system by visually viewing the graphical representation, or by comparing the estimated interaction metric with the true interaction metric when it is available (e.g., calculating the difference between the estimated interaction metric and the true interaction metric). The estimated interaction metric can be fed to external modules of the interaction computer 300. For example, the estimated interaction metric can be fed to a fraud detection module, so that the fraud detection module can be trained using the estimated interaction metric to better detect fraudulent access requests (e.g., to detect fraudulent transactions or log in attempts). Another example can include an evaluation module that calculates the difference between the estimated interaction metric and the true interaction metric. The evaluation module can identify time periods where the estimated interaction metric and the true interaction metric differ significantly, so that the user of the interaction metric estimation system may more closely analyze the interaction data during the identified time periods. Steps 316 through 324 may occur as part of a daily routine, as shown by the dotted box 350.

B. Example Model

The interaction metric estimation model in the above interaction metric estimation system is used to generate the estimated interaction metric. The interaction metric estimation model comprises learnable parameters that can be updated based on new interaction data received.

Figure 4:
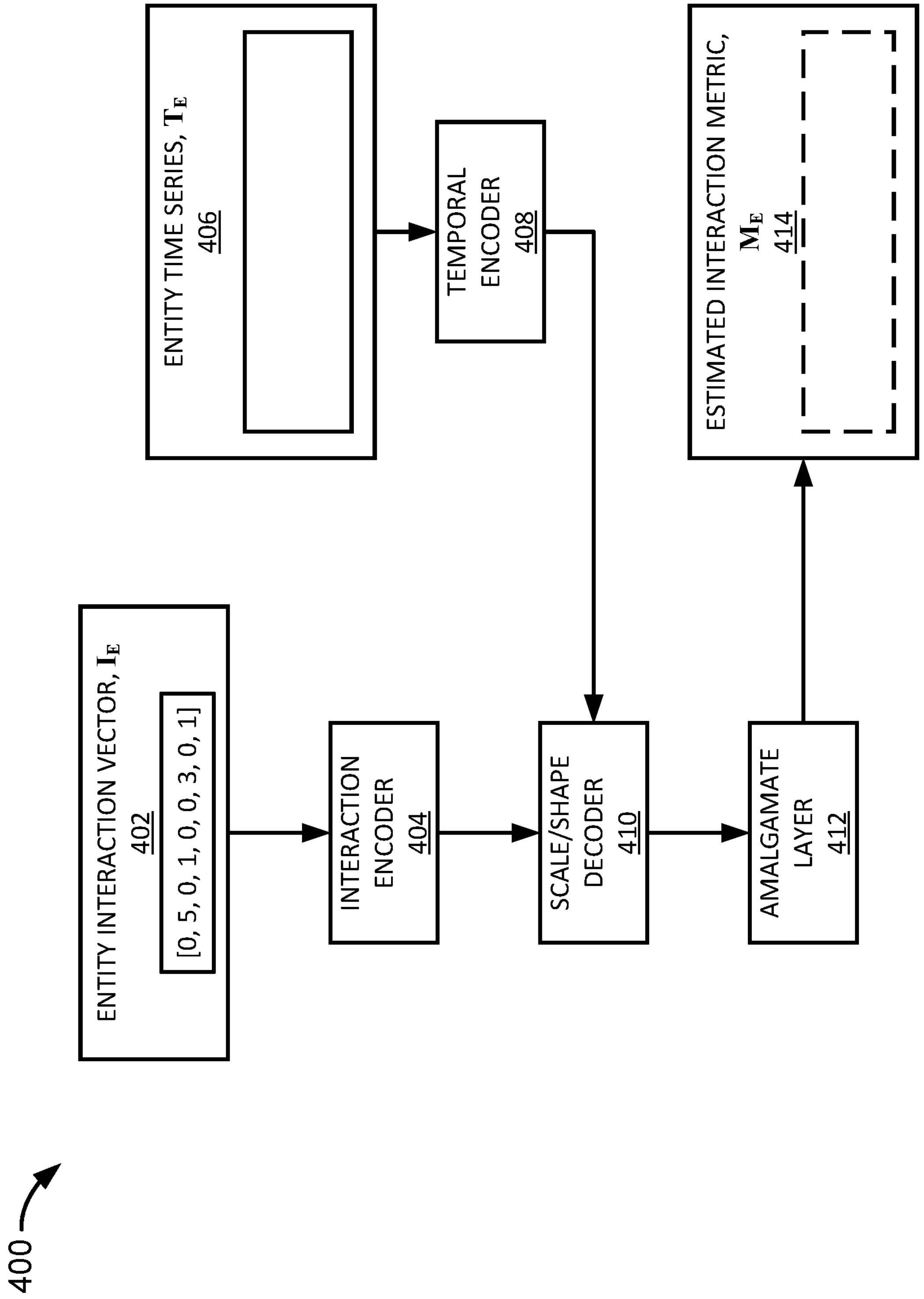
FIG. 4 shows a block diagram of an interaction metric estimation model according to embodiments of the present invention.

FIG. 4 shows a block diagram of an interaction metric estimation model 400 according to embodiments of the present invention. The interaction metric estimation model 400 consists of five components, including an interaction encoder 404, a temporal encoder 408, a scale decoder and shape decoder 412, and an amalgamate layer 412. The interaction metric estimation model 400 may take an entity interaction vector, $I_E$ 402 and an entity time series, $T_E$ 406 as input.

The interaction encoder 404 can process the entity interaction vector, $I_E$ 402. In the example shown in FIG. 4, the entity interaction vector, $I_E$ 402 is of length k equal to nine. The entity represented by the vector would thus interact with nine total entities (e.g., nine different countries). The output of the interaction encoder 404 can be an interaction hidden representation $h_I \in \mathbb{R}^{n_k}$, where $n_k$ is the embedding size for each entity. The embeddings can represent (e.g., by capturing information about) the interactions between electronic devices of different entities in an interaction database, and when combined (e.g., using vector-matrix multiplication) with the interaction vector 402, the resulting interaction hidden representation $h_I$ can capture the information about the interactions between different entities in an interaction database. Multiple interaction types can be integrated by increasing the amount of interaction encoders 404 in the interaction metric estimation model 400.

The temporal encoder 408 can extract the temporal hidden representation $h_T \in \mathbb{R}^{n_k}$ from the input entity time series, $T_E \in \mathbb{R}^{t_p \times d}$ 406, where $n_k$ is size of the output hidden representation vector, $t_p$ is the length of the input time series, and d is the dimensionality of the input time series.

The scale/shape decoder 412 combine the temporal hidden representation $h_T$ with the interaction hidden representation $h_I$ to generate a scale (e.g., a magnitude σ and an offset μ) and a shape estimation for the interaction metric.

The amalgamate layer 412 generates the estimated interaction metric, $M_E$ 414 by processing the shape estimation with the scale obtained from the scale/shape decoder 412.

IV. Model Architecture

The two encoders (e.g., the interaction encoder 404 and the temporal encoder 408) extract hidden representations (e.g., the interaction hidden representation $h_I$ and the temporal hidden representation $h_T$) from the inputs (e.g., the entity interaction vector, $I_E$ 402 and the entity time series, $T_E$ 406) independently. Each encoder is only responsible for one aspect of the input entity. Using the two extracted hidden representations, each decoder then independently provides information regarding different aspects of the estimated interaction metric. The scale decoder providers the scale information (e.g., the magnitude σ and the offset μ), while the shape decoder providers the shape information. The amalgamate layer 412 combines the shape and scale information to generate the estimated interaction metric, $M_E$ 414. Further details of each component of the interaction metric estimation model 400 are described below.

A. Interaction Encoder

Figure 5:
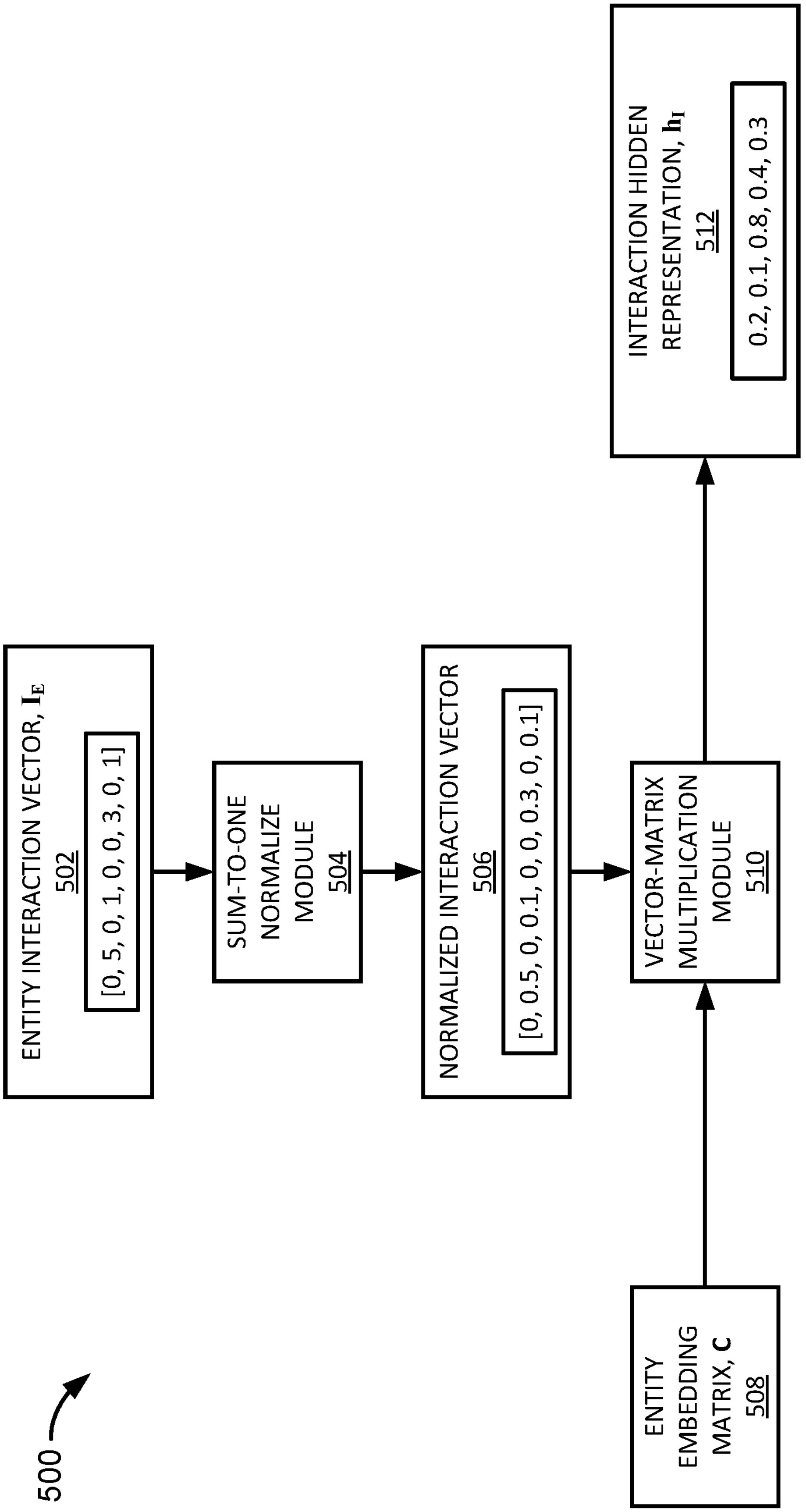
FIG. 5 shows a block diagram of an interaction encoder according to embodiments of the present invention.

FIG. 5 shows a block diagram of an interaction encoder 500 according to embodiments of the present invention. The input to the interaction encoder 500 can be an entity interaction vector, $I_E$ 502. The entity interaction vector, $I_E$ 502 of an entity stores information about the relationship between the chosen entity E and other entities. The entity interaction vector, $I_E$ 502 can be normalized through a sum-to-one normalize module 504. For example, as shown in FIG. 5, the entity interaction vector, $I_E$ 502 [0, 5, 0, 1, 0, 0, 3, 0, 1] can be normalized to obtain the normalized interaction vector 506 [0, 0.5, 0, 1, 0, 0, 0.3, 0, 1] such that the magnitude of the normalized interaction vector 506 is equal to one. The sum-to-one normalize module 504 is used for modeling interactions between different entities in an interaction database. For example, in the country-level transaction metric estimation problem used as a running example, the L1 vector norm of the entity interaction vector, $I_E$ 502 is proportional to the population of the country. The sum-to-one normalization ensures that the hidden representation focuses on capturing the information regarding the interaction between different countries, rather that the population difference of countries.

The normalized interaction vector 506 is combined with an entity embedding matrix, C 508 to generate the interaction hidden representation $h_I$ 512 (a stubbed version is shown in FIG. 5). A vector-matrix multiplication module 510 may compute the interaction hidden representation, $h_I = \bar{I}_E C$ 512. The entity embedding matrix, C 508 contains embeddings corresponding to each country. The interaction hidden representation, $h_I$ 512 is thus a weighted sum of the embeddings of the entity embedding matrix, C 508. The embeddings of the entity embedding matrix, C 508 is a learnable parameter of the interaction encoder 500. The entity embedding matric, C 508 may be initialized randomly, or using existing embeddings. The size of the interaction hidden representation, $h_I$ 512 is dependent on each country's embedding vector size. In the running example, the total number of countries is equal to 233, and the embedding vector is set to 64.

B. Temporal Encoder

Figure 6:
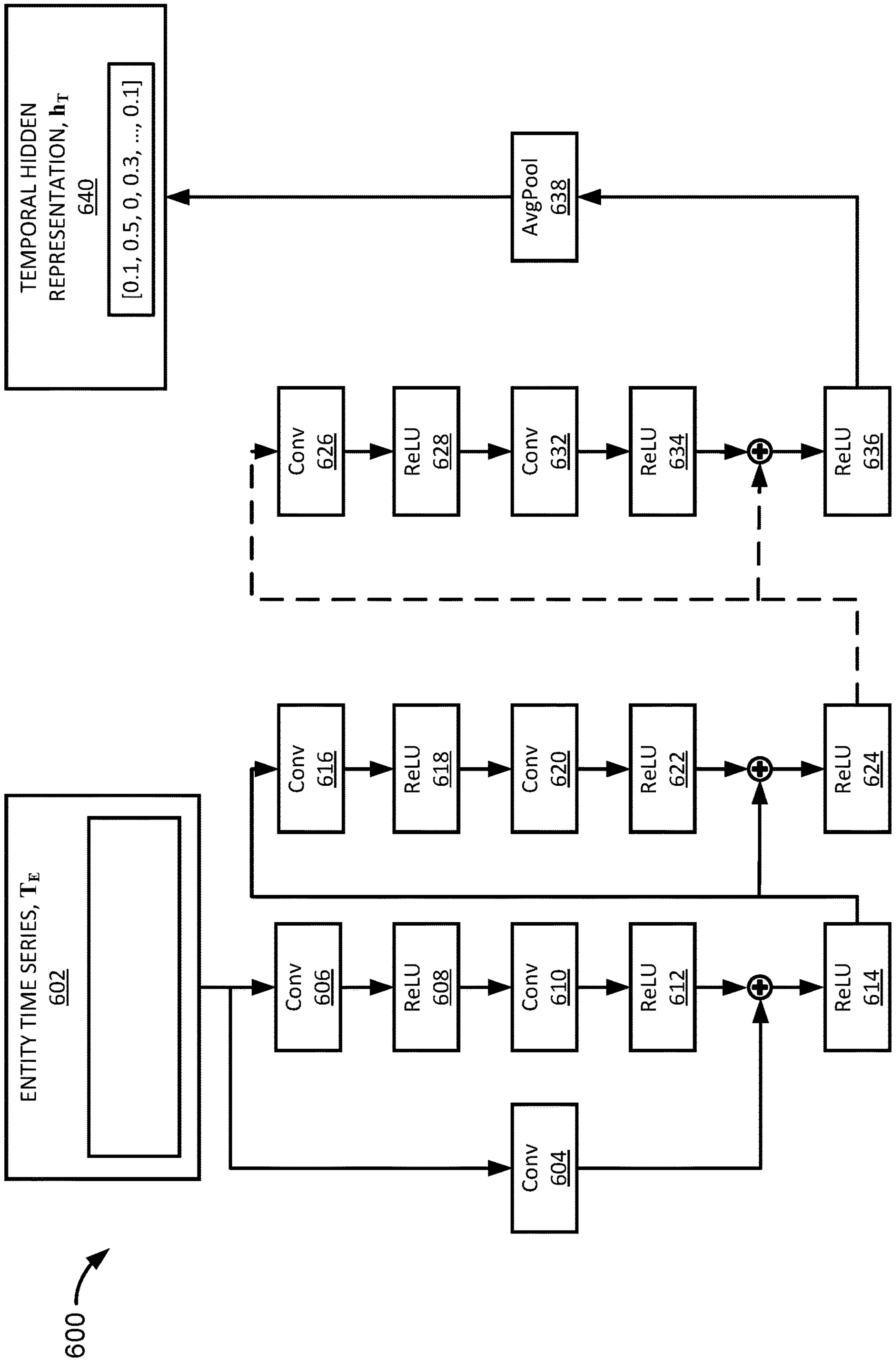
FIG. 6 shows a block diagram of a temporal encoder according to embodiments of the present invention.

FIG. 6 shows a block diagram of a temporal encoder 600 according to embodiments of the present invention. The input to the temporal encoder 600 can be an entity time series, $T_E \in \mathbb{R}^{t_p \times d}$ 602, where $t_p$ is the length of the input time series, and d is the dimensionality of the input time series. The output of the temporal encoder 600 can be a temporal hidden representation vector, $h_T \in \mathbb{R}^{n_k}$ 640, where $n_k$ is the vector size of the output. The temporal encoder 600 analyzes the temporal patterns by extracting features and reducing the dimensionality of the input entity time series, $T_E$ 602. The temporal hidden representation vector, $h_T$ 640 captures the temporal patterns of the entity time series, $T_E$. The vector size $n_k$ depends on the hyper-parameter setting of the last convolutional layer (e.g., the size of the kernel of the convolutional layer). In the running example, $t_p$ is equal to 168 (e.g., seven days of hourly data), and d is equal to 14.

In this example, the body of the temporal encoder 600 comprises a sequence of identical residual blocks. As an example, all of the convolution layers in the temporal encoder 600 except the first convolution layer, Conv 604, have a kernel size of three. Similarly, all convolution layers except the first have 64 kernels. The main passage (e.g., the path of Conv 606 to ReLU 608 to Conv 610 to ReLU 612, or the path of Conv 616 to ReLU 618 to Conv 620 to ReLU 622, etc.) is processed with Conv-ReLU-Conv-ReLU layers before passing through a ReLu layer (e.g., ReLU 614, or ReLU 624). The first residual block (e.g., layers beginning from Conv 606 through ReLU 614) has a convolution layer, Conv 604, that is used to solve the mismatch between the output of the main passage and the residual passage. For example, the input of the residual passage for the first block has 14 channels (e.g., the dimensionality d of the entity time series, $T_E$ 602). The convolutional layers in the residual passage convert the input to 64 channels, which matches the output of the main passage (e.g., the number of kernels for the last convolution layer, Conv 610 of the main passage). The kernel size for the first convolution layer, Conv 604, is equal to one. The output temporal hidden representation vector, $h_T$ 640 is generated by summarizing the output of the residual blocks across time with the global average pooling given by the AvgPool layer 638. The length of the temporal hidden representation vector, $h_T$ 640 matches the number of kernels of the last convolution layer, Conv 632, which is equal to 64.

C. Scale Decoder

Figure 7:
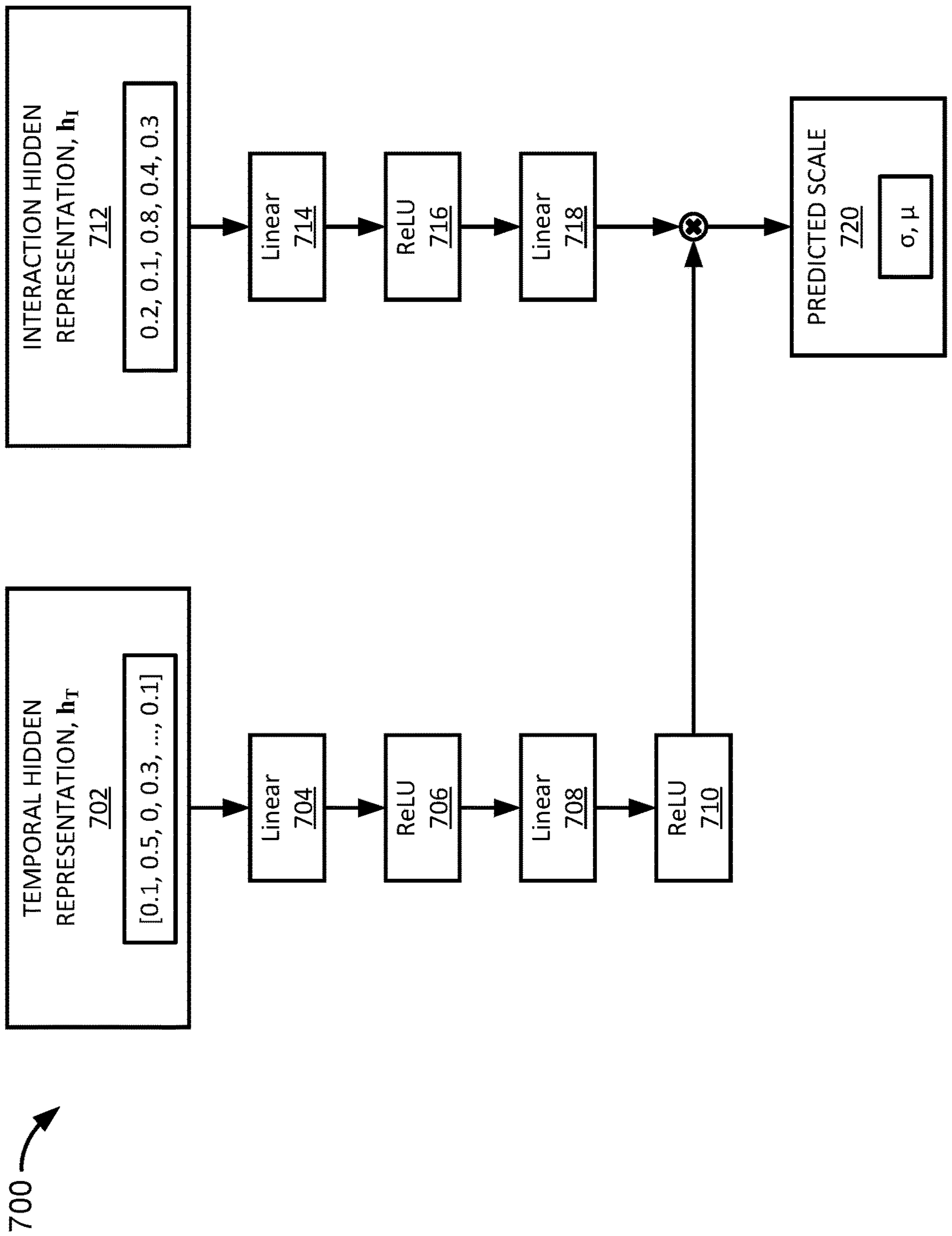
FIG. 7 shows a block diagram of a scale decoder according to embodiments of the present invention.

FIG. 7 shows a block diagram of a scale decoder 700 according to embodiments of the present invention. The input to the scale decoder 700 can be a temporal hidden representation vector, $h_T$ 702 and a interaction hidden representation, $h_I$ 712. The Linear 704 to ReLU 706 to Linear 708 to ReLU 710 layers on the left further process the temporal hidden representation vector, $h_T$ 702 to focus on the information relevant for predicting the scale of the interaction metric. The Linear 714 to ReLU 716 to Linear 718 layers on the right produce a matrix $W\in\mathbb{R}^{n_k\times 2}$ that is used for mapping the output of the left layers to generate a magnitude σ and an offset μ. Entities with similar interaction representations use similar matrices W to estimate the scale of the target interaction metric.

D. Shape Decoder

Figure 8:
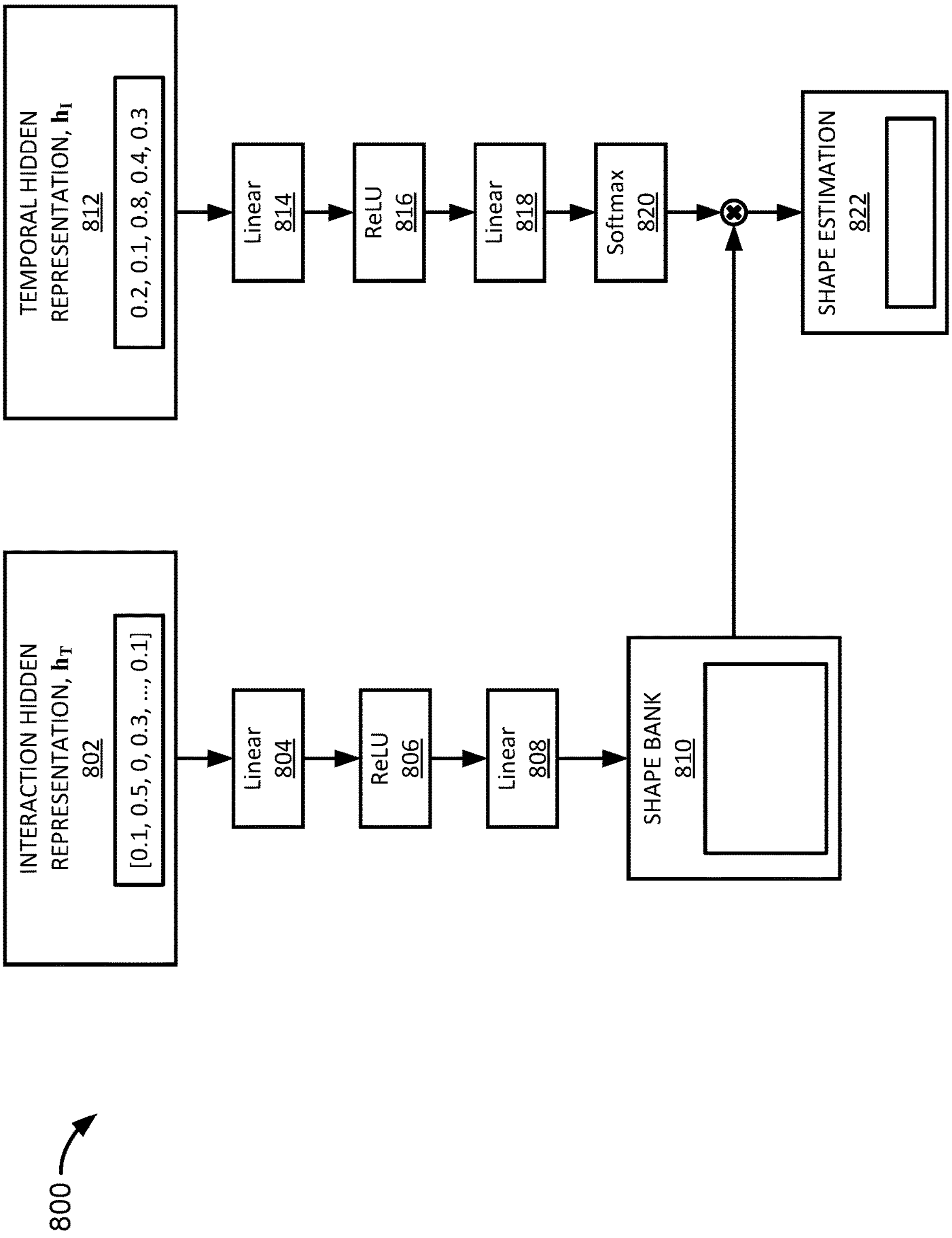
FIG. 8 shows a block diagram of a shape decoder according to embodiments of the present invention.
Figure 9:
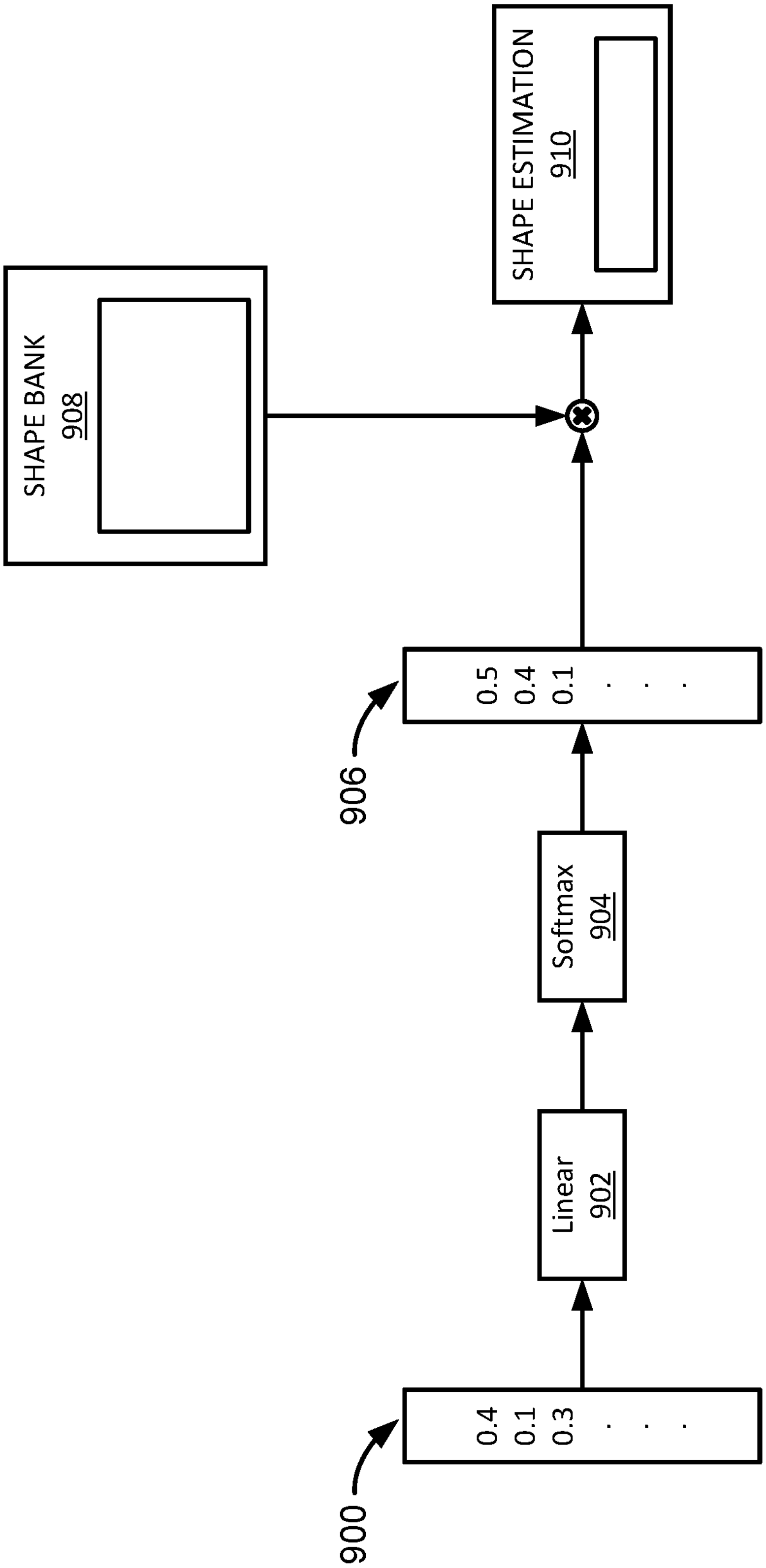
FIG. 9 shows a block diagram of an intermediate view of a shape decoder according to embodiments of the present invention.

FIG. 8 shows a block diagram of a shape decoder 800 according to embodiments of the present invention. The input to the shape decoder 800 can be an interaction hidden representation vector, $h_T$ 802 and a temporal hidden representation, $h_l$ 812. The structure of the shape decoder 800 is similar to the structure of the scale decoder 700. The output of the Linear 804 to ReLU 806 to Linear 808 layers on the left operate on the interaction hidden representation vector, $h_T$ 802 to generate a shape bank 810. The shape bank 810 stores basis shapes for estimating the shape of the target interaction metric. The right leg consists of a Linear 814 to ReLU 816 to Linear 818 to Softmax 820 layer. The last layer for processing the temporal hidden representation, $h_l$ 812 is a Softmax 820 layer, instead of the ReLU 710 layer of the scale decoder 700. The output of the Softmax 820 layer dictates which, and how the shape bank's basis shapes are combined to form the shape prediction 822. For example, the output provides the weights that will be used to combine basis shapes in the shape bank 810. Entities with similar interaction representations should use similar basis shapes for estimating the shape of the target transaction metric. FIG. 9 provides further details on the shape bank 810.

FIG. 9 shows a block diagram of an intermediate view of a shape decoder according to embodiments of the present invention. The intermediate output 900 may be the output of the ReLU 816 layer of the shape decoder 800. The remaining layers (e.g., the Linear 818 and Softmax 820 layers) form a Softmax regression model. The output of the Softmax regression model 906 is always positive and always sums-to-one, it forces the model to pick only relevant basis shapes from the shape bank 908 for the shape estimation 910. As shown in FIG. 9, the shape estimation 910 is generated by combining the basis shapes in the shape bank 910 (e.g., the first shape has a weight of 0.5, the second shape has a weight of 0.4, and the third shape has a weight of 0.1, etc.).

E. Amalgamate Layer

Figure 10:
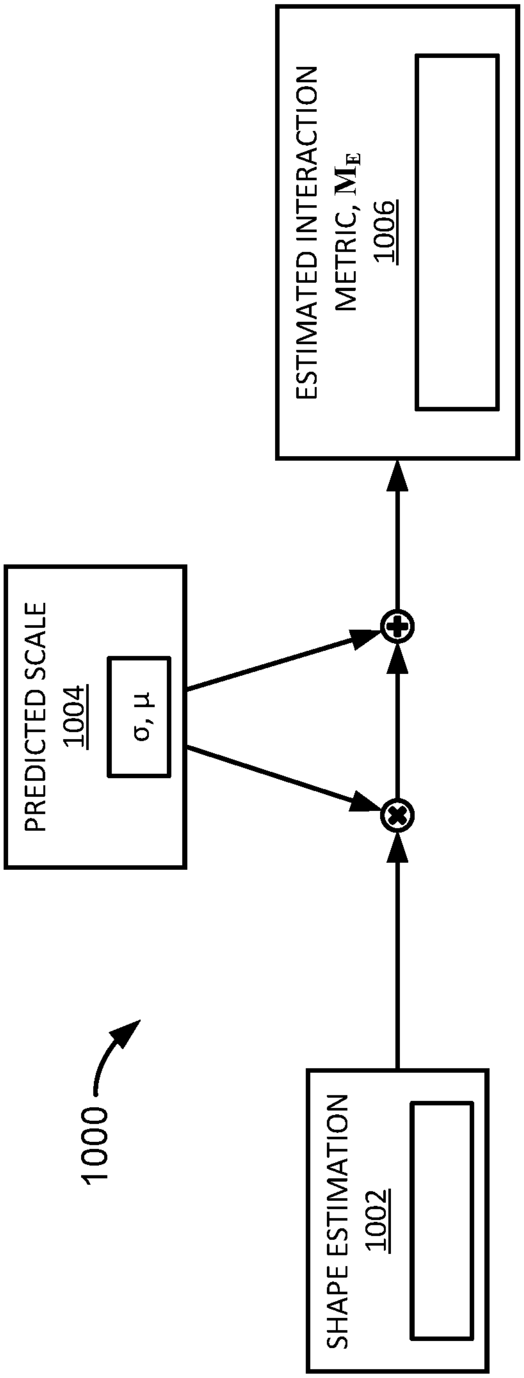
FIG. 10 shows a block diagram of an amalgamate layer according to embodiments of the present invention.

FIG. 10 shows a block diagram of an amalgamate layer 1000 according to embodiments of the present invention. The amalgamate layer 1000 combines a shape estimation 1002 from a shape decoder with a predicted scale 1004 from a scale decoder. The predicted scale 1004 can comprise a magnitude σ and an offset μ. The shape estimation 1002 can be multiplied by the magnitude σ, then the offset μ can be added to the shape estimation 1002. The following loss function (adapted from equation (3)) can be minimized to improve the estimated interaction metric, $\hat{M}_E$ 1006:

$$\sum_{E\in\mathbb{E}i\in[1,\tau_e]} MSE(\hat{M}_E, M_E) + \gamma NMSE(\hat{M}_E^{shape}, M_E) \quad (3)$$

Where MSE( ) is a function that computes the mean squared error, NMSE( ) is a function that computes the normalized mean squared error, γ is a hyper-parameter to ensure the output of MSE( ) and NMSE( ) are of a similar scale, $\hat{M}_E$ is the estimated interaction metric, $\hat{M}_E$ 1006, and $\hat{M}^{shape}{}_E$ is the output of the shape decoder. The normalized mean square error is computed by z-normalizing the ground truth, then calculating the mean squared error between the z-normalized ground truth and the estimated interaction metric, $\hat{M}_E$ 1006.

V. Online Learning Scheme

As described in section III.a., the interaction metric estimation model can be trained to improve the estimated interaction metrics. Training of the interaction metric estimation model can comprise an offline training phase and an online training phase.

A. Training Algorithm

FIG. 11 shows a training algorithm 1100 according to embodiments of the present invention. The training algorithm 1100 takes as input a set of entities $\mathbb{E}$ . The line 2, the interaction metric estimation model is initialized. Next, in line 3, the interaction metric estimation model is trained offline using available interaction data (e.g., as described in step 314 of FIG. 3). In line 4, an online training phase can be initiated. In lines 5 and 6, the function can check if it is time to update the model. For example, if the interaction metric estimation model is updated daily, the time to update variable can be a variable that counts 24 hours. In line 7, after determining the interaction metric estimation model is to be updated, the latest interaction data (e.g., determined by the current value of the time to update variable) can be pulled from an interaction database. In lines 8 through 10, the model can be updated for $n_{iter}$ total iterations. In line 9, a batch of entities and their associated interaction vectors, time series, and interaction metric can be sampled from the set of entities. The sampling step has a significant impact on the performance of the interaction metric estimation model. When concept drift is encountered, irrelevant data is encountered more often. In line 10, the interaction metric estimation model is updated using the mini-batch. In line 11, the estimated interaction metric for each entity in the set of entities is generated and the estimated interaction metrics are returned in line 12.

B. Modified FLUSS Algorithm

Improvements to the sampling method for the mini-batch can be made to counter concept drift. Time series segmentation can be used to identify, in a data driven fashion, a window of data to be used in the mini-batch, and a time decay function. Several sampling techniques can be used for sampling the mini-batch when updating the model during online training. Two categories of sampling techniques, including temporal-based and non-temporal-based sampling methods are identified.

Temporal-based sampling techniques can include fixed window sampling, time decay sampling, and time series segmentation sampling. Fixed window sampling samples the training examples within the latest x days uniformly, where x is a hyper-parameter (e.g., it ignores older data). Time decay sampling samples the training examples with a decaying probability as the data ages. In later examples, time decay sampling uses linear decay. Segmentation sampling uses a window and time decay function in a data driven fashion, based on a matrix profile. The matrix profile includes nearest neighbor relationship between subsequences of a time series sequence.

Non-temporal sampling techniques can include similarity, high error, low error, and training dynamic based sampling. In non-temporal sampling techniques, the temporal location of each candidate sample is not considered in the sampling process. Similarity biases towards examples that are more similar to the current time series (e.g., $T_E[i-t_p:i]$, where i is the current time). As it only looks at the current time series it helps when concept drift affects the time series. High error biases towards "hard" examples for the current interaction metric estimation model. Pushing the interaction metric estimation model towards hard examples is commonly seen in boosting-based ensemble methods. Low error biases towards examples that can be predicted well based on the current model. The targeted interaction metric can be noisy, and low error biases can be used to remove noisy samples as they tend to introduce large errors. Training dynamic based sampling uses confidence and variability to sample data.

Figure 13:
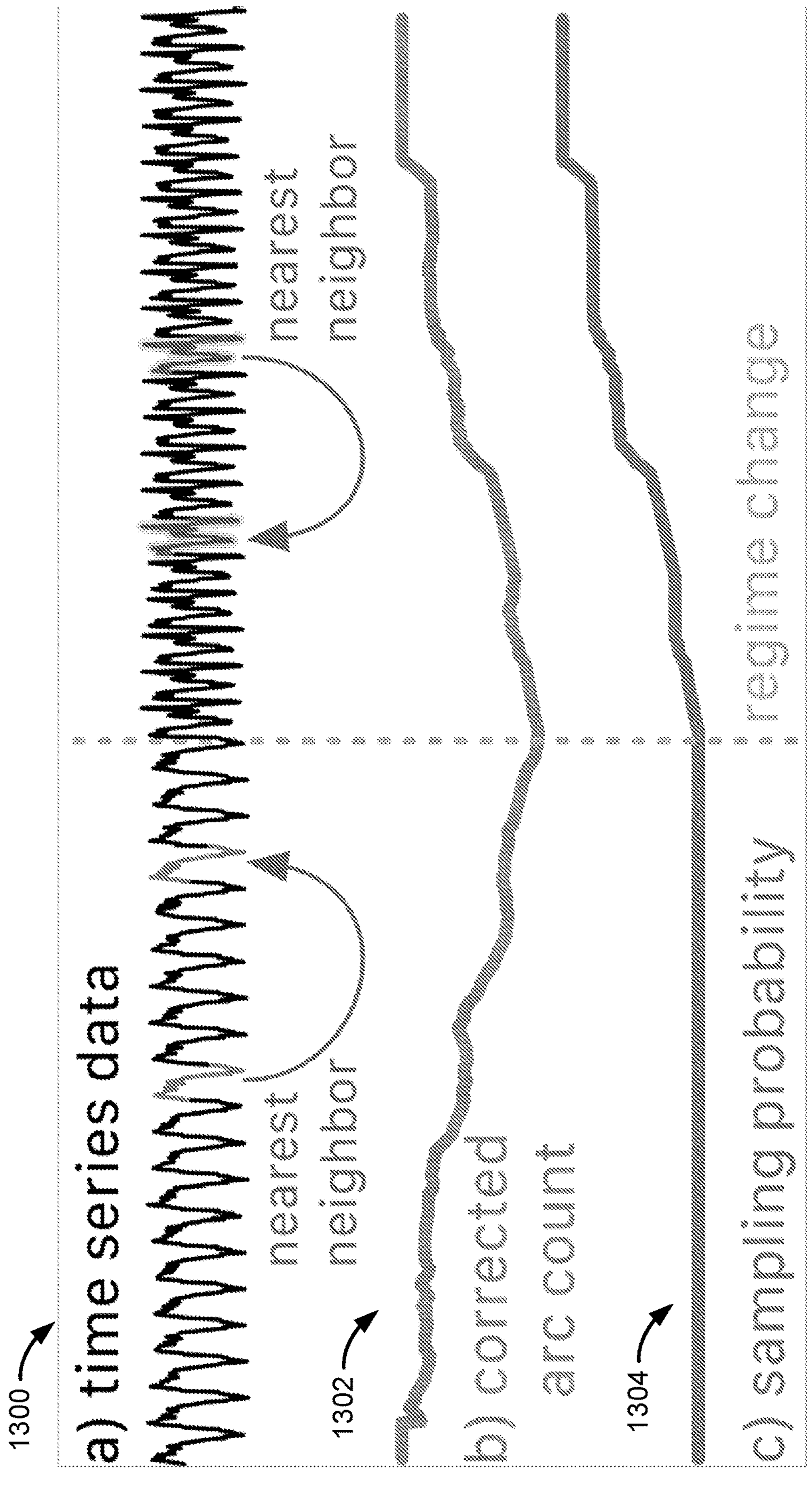
FIG. 13 shows time series data, a corrected arc count, and an associated sampling probability according to embodiments of the present invention.

FIG. 12 shows a modified FLUSS algorithm 1200 according to embodiments of the present invention. The modified FLUSS algorithm 1200 is built upon a matrix profile. The matrix profile can be used to efficiently explore the nearest neighbor relationship between subsequence of a time series sequence. The input to the modified FLUSS algorithm 1200 is an entity time series, $T_E$. In lines 2 through 5, each iteration of the loop processes each dimension of the entity time series, $T_E$ independently. In line 3, the matrix profile index of the input time series i-th dimension is computed. The matrix profile index shows the nearest neighbor of each subsequence in the input entity time series, $T_E$, where the subsequence length used is $t_p$. Each subsequence is connected with its nearest neighbor using an arc based on the information in the matrix profile index, as shown in FIG. 13. To further process the matrix profile index, the corrected arc count curve is computed in line 4. The corrected arc count curve records the number of arcs passing through each temporal location in the time series. The corrected arc count curve includes a correction to correct that it is more likely for an arc to pass through the center of the time series than an arc to pass through the ends of the time series. The correction is applied by comparing the actual count of arcs to the expected count. Once the correct arc count curve is computed, the corrected arc count curve is converted to a sampling probability. From lines 6 to 11, a for loop is used to enforce a non-decreasing constrain to ensure the subsequences belong to the newest regime (e.g., subsequences after the latest segmentation point) have higher sampling probabilities compared to subsequences from the old regimes. In line 12, the non-decreasing corrected arc count curve is converted to a probability and is returned in line 13. The probability can be used in line 9 of the training algorithm 1100 to more efficiently sample the mini-batch.

FIG. 13 shows time series data 1300, a corrected arc count 1302, and an associated sampling probability 1304 according to embodiments of the present invention. The first and second half of the time series 1300 are significantly different. An arc only connects similar subsequences, and as such there is almost no arc passing through the center of the time series that connects similar subsequences. For this reason, the corrected arc count 1302 sees a decline near the regime change. The corrected arc count 1302 is converted into a sampling probability 1304. A non-decreasing constrain (e.g., lines 6 through 11 of the modified FLUSS algorithm 1200) is applied to the corrected arc count 1302 to ensure the subsequences belonging to the newest regime have higher sampling probabilities. The non-decreasing constrain flattens the corrected arc count 1302 before the regime change to form the sampling probability 1304.

VI. Evaluation of Model

The interaction metric estimation model provides a number of advantages. The interaction metric estimation model allows a processing network to more efficiently and more accurately predict interaction metrics. The design of the example model shown in FIG. 18 result in a number of improvements over conventional methods.

A. Model Verification

Figure 14:
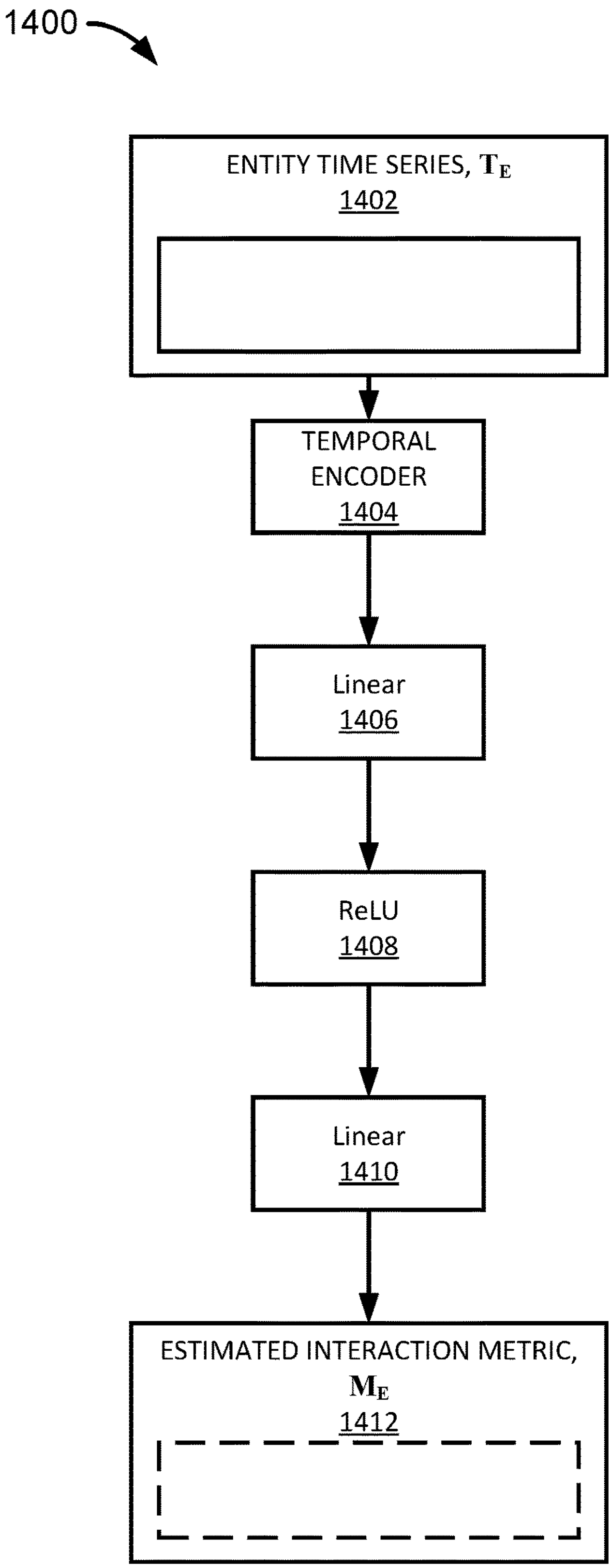
FIG. 14 shows a first baseline model according to embodiments of the present invention.

FIG. 14 shows a first baseline model 1400 according to embodiments of the present invention. The first baseline model 1400 can take an entity time series, $T_E$ 1402 as input. The first baseline model 1400 does not include an interaction vector. Further, the first baseline model 1400 is simpler than the interaction metric estimation model shown in FIG. 4, as it does not include either the shape or scale decoders.

Figure 15:
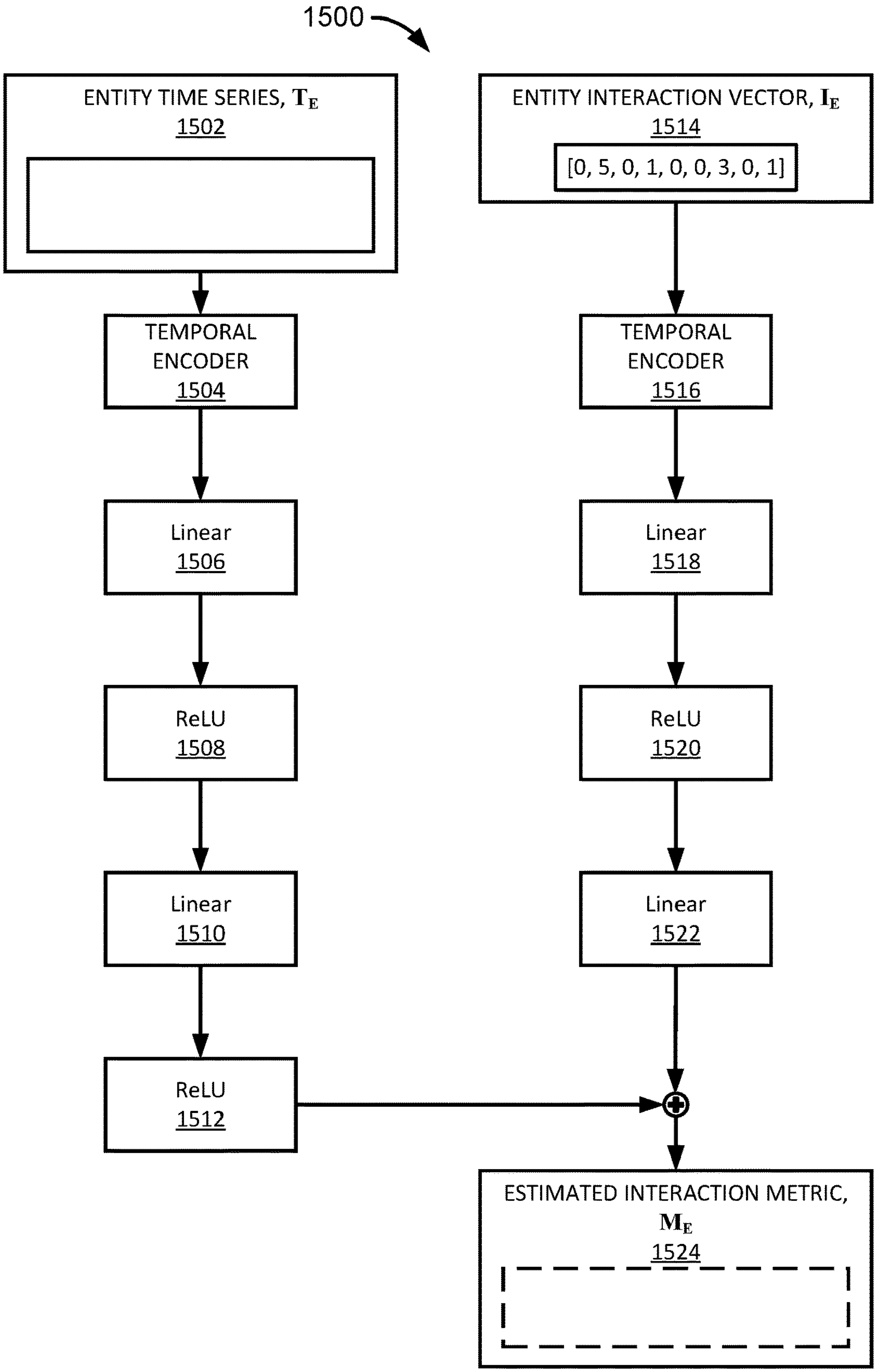
FIG. 15 shows a second baseline model including an entity interaction vector as input according to embodiments of the present invention.

FIG. 15 shows a second baseline model 1500 including an entity interaction vector, $I_E$ 1514 as input according to embodiments of the present invention. The second baseline model 1500 is simpler than the interaction metric estimation model shown in FIG. 4, as it does not include either the shape or scale decoders. The second baseline model 1500 is trained using equation (2), by minimizing the MSE loss function. The passage that processes the entity interaction vector, $I_E$ 1514 outputs a matrix $W \in \mathbb{R}^{n_k \times (t_a + t_b)}$. The matrix W is multiplied by the output of the passage that processes the entity time series, $T_E$ 1602 to generate the estimated interaction metric, $\hat{M}_E$ 1624.

FIG. 16 shows a table 1600 demonstrating the improvement of using an entity time series. The temporal encoders of the first baseline model 1400 and the second baseline model 1500 can be based on a convolutional neural network (CNN), as shown in FIG. 6, or they can be based on two layers of a recurrent neural network (RNN) with gated recurrent units (GRUs). There is a consistent improvement seen by using the second baseline model 1500 over the first baseline model 1400. The performance measures used include root mean squared error (RMSE), normalized root mean squared error (NRMSE), and coefficient of determination ($R^2$). The improvements are consistent through the use of both temporal encoders based on CNNs and RNNs, with RNN-based temporal encoders performing slightly better than the CNN-based temporal encoder.

FIG. 17 shows a table 1700 demonstrating the improvement of using a shape and scale decoder. The second baseline model 1500 of FIG. 15 is compared to the interaction metric estimation model 400 of FIG. 4. Again, the improvement of using a shape and scale decoder is consistent over the use of RNN-based and CNN-based temporal encoders and over different performance measures. The best performance, according to table 1700, is when the interaction metric estimation model uses a CNN-based temporal encoder (e.g., the interaction metric estimation model 400).

FIG. 18 shows a table 1800 demonstrating the improvement of the interaction metric estimation model over several machine learning models. The interaction metric estimation model 400 is compared to several off-the-shelf machine learning solutions in a production environment. The percent improvement is computed against the best alternative, based on each performance measurement. As both NRMSE and $R^2$ are computed on a normalized scale and measure how the estimated trend matches the ground truth, the interaction metric estimation model captures more details in the interaction metric than the alternative machine learning models.

A. Online Learning

FIG. 19 shows a table 1900 demonstrating the improvement of using online training in addition to offline training. The interaction metric estimation model 400 of FIG. 4 is used to verify the benefits of online training. The offline training row calculates performance metrics of the interaction metric estimation model when it is only trained once, using interaction data stored in an interaction database. The online training row calculates performance metrics of the interaction metric estimation model that is updated using the training algorithm 1100 of FIG. 11. Online training provides an improvement over only using offline training in all performance metrics used, and provides a significant improvement in the $R^2$ performance metric.

FIG. 20 shows a table 2000 demonstrating the performance benefits of improving the online training scheme. Refining the online training scheme used to train the interaction metric estimation model can provide further increases in performance metrics. A baseline online training scheme (e.g., uniform sampling of the time series) is compared to an improved online training scheme that implements segmentation and similarity when sampling the time series. Increases in all three performance metrics are seen.

Temporal-based sampling techniques (e.g., uniform sampling, 90 day fixed window sampling, 365 day fixed window sampling, time decay sampling, and time series segmentation sampling) and non-temporal based sampling techniques (e.g., uniform, similarity, high error, low error, high-confidence, low-confidence, high-variability, and low variability) can be used in the online learning scheme. Temporal-based sampling techniques and non-temporal based sampling techniques are combined.

FIG. 21 shows a table 2100 demonstrating an RMSE performance metric of several combinations of temporal-based sampling techniques and non-temporal-based sampling techniques. Generally, to learn a better interaction metric estimation model, it needs to see interaction data more than 90 days old, as the 90 days fixed window performs worse than the baseline. For non-temporal based methods, similar, low-error, high-confidence, and low-variability outperform the baseline. The low-error, high-confidence, and low-variability push the interaction metric estimation model push the model to focus on easy or consistent examples in the training interaction data. The improvement is likely caused by the removal of noisy training examples. Combining low-error sampling with segment sampling results in the best RMSE performance metric.

FIG. 22 shows a table 2200 demonstrating an NRMSE performance metric of several combinations of temporal-based sampling techniques and non-temporal-based sampling techniques. According to the table 2200, for temporal-based methods, segment gives superior performance compared to others. When combining segment with non-temporal-based methods, the conclusion is similar to table 2100. Better methods include similar, low-error, high-confidence, and low-variability. Overall, combining similar with segment results in the best NRMSE performance metric.

FIG. 23 shows a table 2300 demonstrating an $R^2$ performance metric of several combinations of temporal-based sampling techniques and non-temporal-based sampling techniques. $R^2$ is more similar to NRMSE compared to RMSE, and as such when examining only temporal-based sampling techniques or non-temporal-based sampling techniques results in the same conclusions as table 2200. The combination of similar with 90 day fixed window results in the best $R^2$ performance metric.

Considering table 2100, table 2200, and table 2300, both of the combination of similar sampling with segment sampling, and the combination of low-error bias with segment sampling have great average ranks in all performance metrics. The interaction metric estimation model 400 of FIG. 4 was presented using similar sampling with segment sampling.

VI. Method

Figure 24:
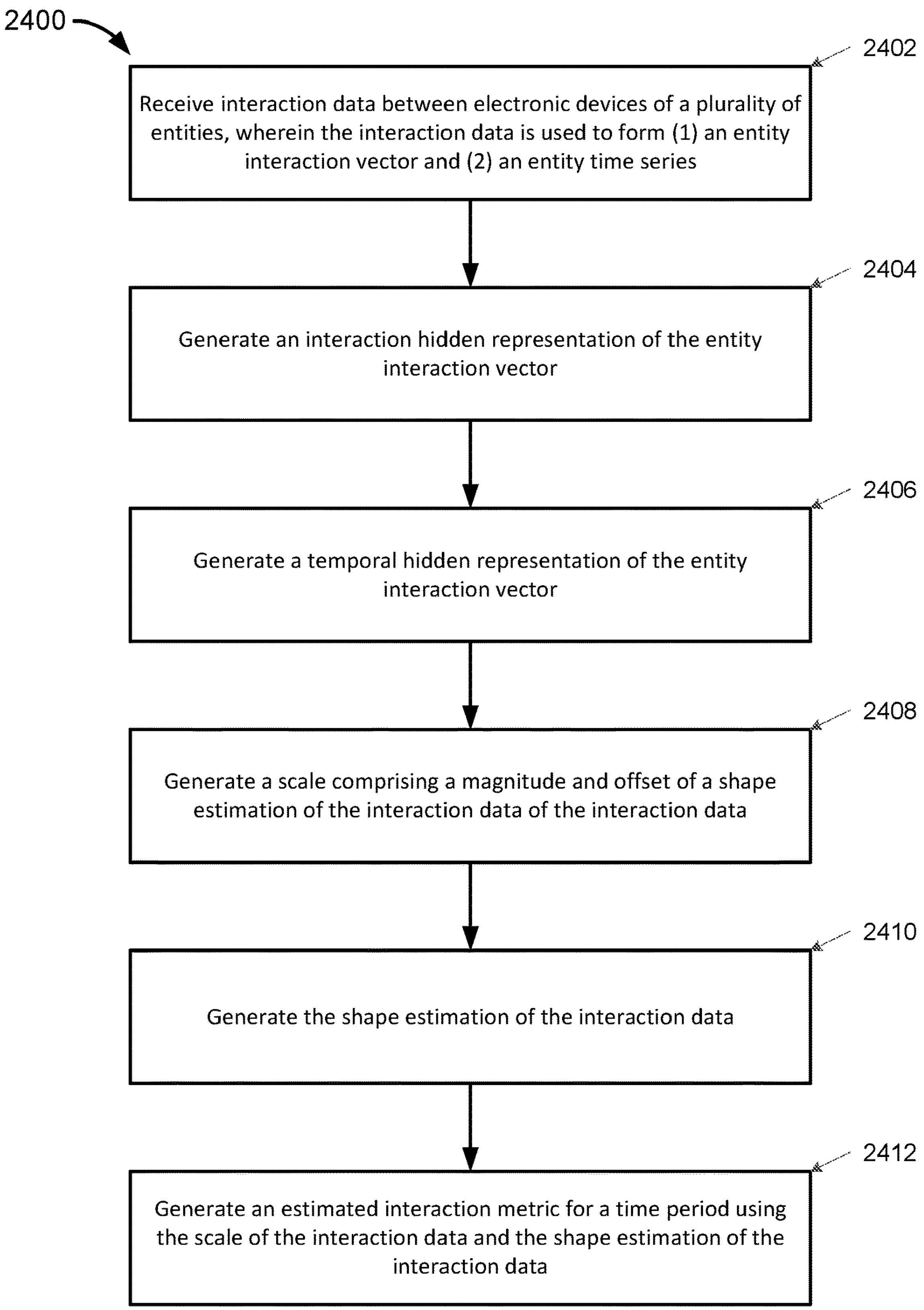
FIG. 24 shows a method for generating an estimated interaction metric for a time period according to embodiments of the present invention.

FIG. 24 shows a method 2400 for generating an estimated interaction metric for a time period according to embodiments of the present invention. The estimated interaction metric may provide an estimate for a true interaction metric over the time period. For example, the estimated interaction metric may estimate the true interaction metric for the next 24 hours. The method 2400 may be performed by a computer, such as the interaction computer 300 of FIG. 3. The method 2400 may be performed by the computer after each time period (e.g., if the time period is 24 hours, the computer may perform the method daily so that the interaction metric is estimated daily). The computer can choose the time period that the estimated interaction metric is generated for by training an interaction metric estimation model comprising an interaction encoder, a temporal encoder, a scale decoder, a shape decoder, and an amalgamate layer. For example, the computer can use the algorithms of FIGS. 11 and 12 using interaction data nearest to the chosen time period.

At step 2402, the computer can receive interaction data between electronic devices of a plurality of entities. The interaction data can be used to form (1) an entity interaction vector (e.g., as described in section II) and (2) an entity time series (e.g., as described in section I). The entity interaction vector provides a view of the relationship between the plurality of entities. The entity interaction vector can contain a number of interactions between the electronic devices of a chosen entity of the plurality of entities and the plurality of entities. The entity time series can contain a plurality of metrics per unit time the interactions of the electronic devices of the chosen entity. Examples of metrics can include number of interactions (e.g., access requests) per unit time (e.g., a number of transactions performed, a number of log in attempts made in to a computer account), a number of declined interactions per unit time (e.g., a number of declined transactions), or a number of unique accounts used to perform interactions per unit time (e.g., a number of unique credit cards made to perform a transaction, a number of unique accounts that were logged in to).

At step 2404, the computer can generate an interaction hidden representation of the entity interaction vector. The interaction hidden representation captures information about interactions between the electronic devices of the plurality of entities. The computer can generate the interaction hidden representation of the entity interaction vector using an interaction encoder that uses the entity interaction vector and an entity embedding matrix to generate the interaction hidden representation. The entity embedding matrix can contain embeddings corresponding to each of the plurality of entities. For example, the computer can use the interaction encoder 500 of FIG. 5 with the entity interaction vector as input to generate the interaction hidden representation of the entity interaction vector. As described in FIG. 5, the interaction encoder can comprise a normalization module that operates on the entity interaction vector to generate a normalized entity interaction vector. Further, a vector-matrix multiplication module that operates on the entity embedding matrix and the normalized entity interaction vector can be used to generate the interaction hidden representation.

At step 2406, the computer can generate a temporal hidden representation of the entity interaction vector. The temporal hidden representation captures inherent patterns of the interactions between the electronic devices of the plurality of entities. The computer can generate the temporal hidden representation of the entity time series using a temporal encoder that uses the entity time series to generate the temporal hidden representation. For example, the computer can use the temporal encoder 600 of FIG. 6 with the entity time series as input to generate the temporal hidden representation of the entity time series. As described in FIG. 6, the temporal encoder can comprise a plurality of residual blocks and an average pooling layer that operate on the inputted entity time series.

At step 2408, the computer can generate a predicted scale comprising a magnitude and offset of a shape estimation of the interaction data of the interaction data. The predicted scale can comprise a magnitude and an offset of a shape estimation of the interaction data. The computer can generate the predicted scale of the interaction data using a scale decoder that uses the interaction hidden representation and the temporal hidden representation to generate the predicted scale. For example, the computer can use the scale decoder 700 of FIG. 7 with the interaction hidden representation and the temporal hidden representation to generate the predicted scale comprising the magnitude and the offset of the shape estimation of the interaction data. As described in FIG. 7, the scale decoder can comprise a plurality of linear activations layers and rectifiers.

At step 2410, the computer can generate the shape estimation of the interaction data. The computer can generate the shape estimation of the interaction data using a shape decoder that uses the interaction hidden representation and the temporal hidden representation to generate the shape estimation. For example, the computer can use the shape decoder 700 of FIG. 7 with the interaction hidden representation and the temporal hidden representation to generate the shape estimation. As described in FIG. 7, the shape decoder can comprise a shape bank, linear activations, rectifiers, and a Softmax regression layer, wherein the shape bank stores shapes for estimating the estimated interaction metric.

At step 2412, the computer can generate an estimated interaction metric for a time period using the scale of the interaction data and the shape estimation of the interaction data. The computer can generate the estimated interaction metric for the time period using an amalgamate layer that uses the predicted scale of the interaction data with the shape estimation of the interaction data. The estimated interaction metric can be fed to external modules of the computer for further processing, such as a fraud detection module (e.g., the estimated interaction metric can be used for training of the fraud detection module).

VIII. Computer System

Figure 25:
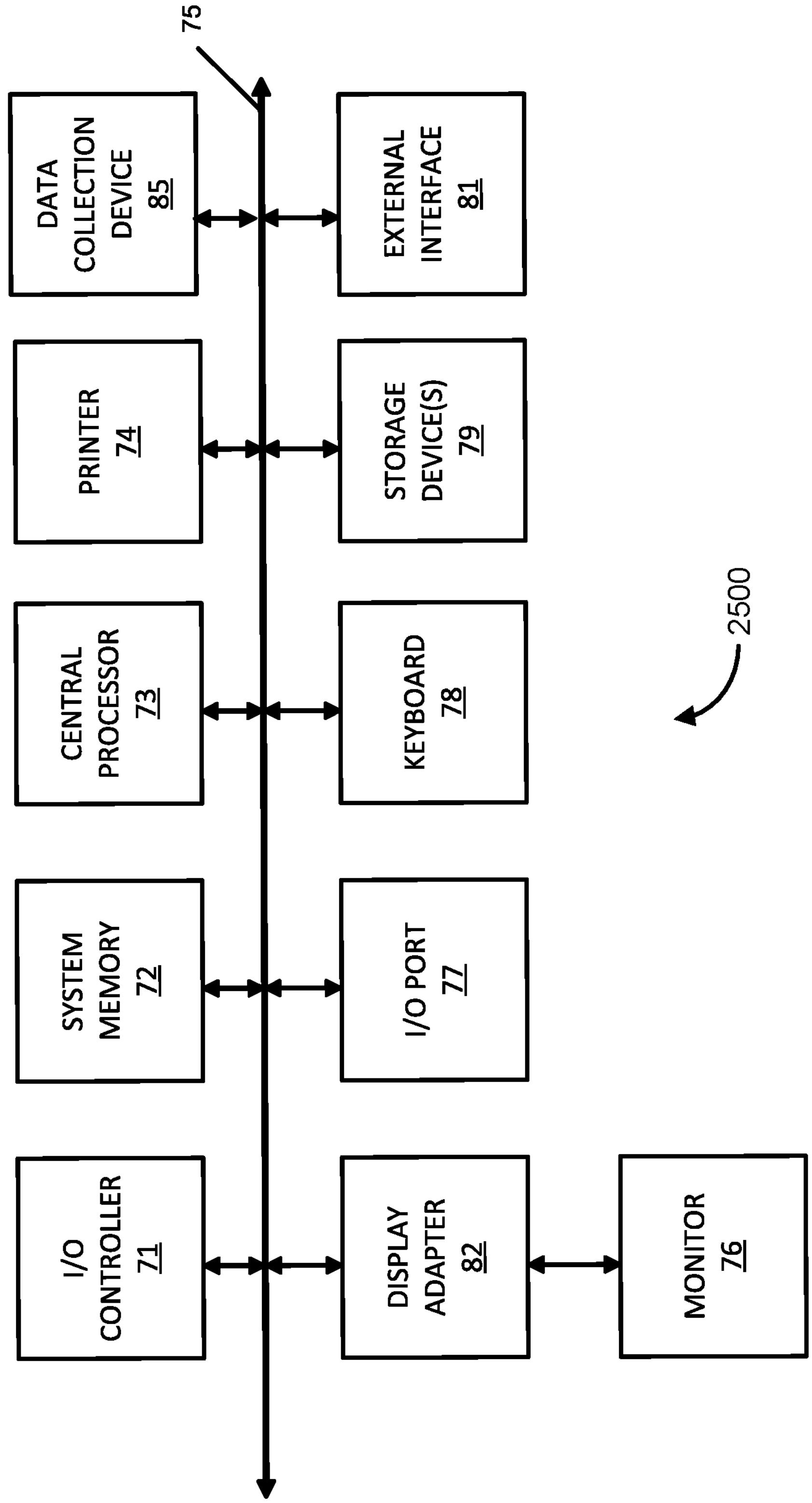
FIG. 25 shows a block diagram of an exemplary computer system according to embodiments of the present invention.

FIG. 25 shows a block diagram of an exemplary computer system 2400 according to embodiments of the present invention.

Any of the computer systems mentioned herein may utilize any suitable number of subsystems. Examples of such subsystems are shown in FIG. 25 in computer apparatus 2500. In some embodiments, a computer system includes a single computer apparatus, where the subsystems can be components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 25 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein and in the appendix are incorporated by reference in their entirety for all purposes. None is admitted to be prior art. Where a conflict exists between the instant application and a reference provided herein, the instant application shall dominate.

What is claimed is:

1. A method comprising, performing by a computer:

receiving interaction data between electronic devices of a plurality of entities, wherein the interaction data is used to form (1) an entity interaction vector containing a number of interactions between the electronic devices of a chosen entity of the plurality of entities and the plurality of entities and (2) an entity time series containing a plurality of metrics per unit time of the interactions of the electronic devices of the chosen entity;

generating, using an interaction encoder, an interaction hidden representation of the entity interaction vector using embeddings of the plurality of entities, wherein the embeddings represent interactions between the electronic devices of the plurality of entities;

generating, using a temporal encoder, a temporal hidden representation of the entity time series, wherein the temporal hidden representation captures time-varying patterns of the interactions between the electronic devices of the plurality of entities;

generating, using the interaction hidden representation and the temporal hidden representation, a predicted scale comprising a magnitude of a target interaction metric;

generating, using the interaction hidden representation and the temporal hidden representation, a shape estimation of the target interaction metric; and generating an estimated interaction metric of a time period using the predicted scale and the shape estimation.

2. The method of claim 1, further comprising:

providing the estimated interaction metric to an interaction database, wherein the estimated interaction metric is provided to external modules of the computer.

3. The method of claim 1, wherein the interaction encoder uses the entity interaction vector and an entity embedding matrix to generate the interaction hidden representation.

4. The method of claim 3, wherein the interaction encoder comprises a normalization module that operates on the entity interaction vector to generate a normalized entity interaction vector and a vector-matrix multiplication module that operates on the entity embedding matrix and the normalized entity interaction vector to generate the interaction hidden representation.

5. The method of claim 1, wherein the temporal encoder uses the entity time series to generate the temporal hidden representation.

6. The method of claim 5, wherein the temporal encoder comprises a plurality of residual blocks and an average pooling layer.

7. The method of claim 1, wherein the predicted scale further comprises an offset of the target interaction metric.

8. The method of claim 7, wherein the predicted scale is generated using a scale decoder comprising a plurality of linear activations layers and rectifiers.

9. The method of claim 1, wherein the plurality of metrics per unit time of the interactions comprises one or more of a number of interactions per unit time, a number of declined interactions per unit time, or a number of unique accounts used to perform interactions per unit time.

10. The method of claim 1, wherein the shape estimation of the interaction data is generated using a shape decoder that uses the interaction hidden representation and the temporal hidden representation to generate the shape estimation.

11. The method of claim 10, wherein the shape decoder comprises a shape bank, linear activations, rectifiers, and a Softmax regression layer.

12. The method of claim 11, wherein the shape bank stores shapes for estimating the estimated interaction metric.

13. The method of claim 1, wherein the estimated interaction metric is generated using an amalgamate layer that uses the predicted scale of the interaction data with the shape estimation of the interaction data, and wherein the amalgamate layer is associated with a loss function that minimizes a difference of the estimated interaction metric and the shape estimation.

14. The method of claim 1 further comprising:

receiving, by the computer from the electronic devices of the plurality of entities, access requests comprising the interaction data, wherein each access request is for a destination entity of the plurality of entities; and updating the entity interaction vector and the entity time series associated with the destination entity of the plurality of entities using the interaction data of the access request.

15. A computer comprising:

a processor; and a non-transitory computer readable medium comprising instructions executable by the processor to perform operations including:

receiving interaction data between electronic devices of a plurality of entities, wherein the interaction data is used to form (1) an entity interaction vector containing a number of interactions between the electronic devices of a chosen entity of the plurality of entities and the plurality of entities and (2) an entity time series containing a plurality of metrics per unit time of the interactions of the electronic devices of the chosen entity;

generating an interaction hidden representation of the entity interaction vector, wherein the interaction hidden representation captures information about interactions between the electronic devices of the plurality of entities;

generating a temporal hidden representation of the entity time series, wherein the temporal hidden representation captures inherent patterns of the interactions between the electronic devices of the plurality of entities;

generating a predicted scale comprising a magnitude and an offset of a shape estimation of the interaction data of the interaction data;

generating the shape estimation of the interaction data; and generating an estimated interaction metric for a time period using the predicted scale of the interaction data and the shape estimation of the interaction data.

16. The computer of claim 15, wherein the interaction hidden representation of the entity interaction vector is generated using an interaction encoder that uses the entity interaction vector and an entity embedding matrix to generate the interaction hidden representation, and wherein the interaction encoder comprises a normalization module that operates on the entity interaction vector to generate a normalized entity interaction vector and a vector-matrix multiplication module that operates on the entity embedding matrix and the normalized entity interaction vector to generate the interaction hidden representation.

17. The computer of claim 15, wherein the temporal hidden representation of the entity time series is generated using a temporal encoder that uses the entity time series to generate the temporal hidden representation, and wherein the temporal encoder comprises a plurality of residual blocks and an average pooling layer.

18. The computer of claim 15, wherein the predicted scale of the interaction data is generated using a scale decoder, wherein the scale decoder uses the interaction hidden representation and the temporal hidden representation to generate the predicted scale, and wherein the scale decoder comprises a plurality of linear activations and rectifiers.

19. The computer of claim 15, wherein the shape estimation of the interaction data is generated using a shape decoder that uses the interaction hidden representation and the temporal hidden representation to generate the shape estimation, and wherein the shape decoder comprises a shape bank storing shapes for estimating the estimated interaction metric, linear activations, rectifiers, and a Softmax regression.

20. The computer of claim 15, wherein the estimated interaction metric is generated using an amalgamate layer that uses the predicted scale of the interaction data with the shape estimation of the interaction data, and wherein the amalgamate layer is associated with a loss function that minimizes a difference of the estimated interaction metric and the shape estimation.

* * * * *